United States Patent
Langlands et al.

(10) Patent No.: US 8,919,479 B1
(45) Date of Patent: Dec. 30, 2014

(54) MECHANISM FOR PROPELLING A VEHICLE

(75) Inventors: Kyle Andrew Langlands, Lino Lakes, MN (US); David L. Bagnariol, Shafer, MN (US); Chris L. Wurtz, Forest Lake, MN (US)

(73) Assignee: Polaris Industries Inc., Medina, MN (US)

( * ) Notice: Subject to any disclaimer, the term of this patent is extended or adjusted under 35 U.S.C. 154(b) by 1211 days.

(21) Appl. No.: 11/828,026

(22) Filed: Jul. 25, 2007

(51) Int. Cl.
  *B62M 23/02* (2010.01)

(52) U.S. Cl.
  CPC .................................. *B62M 23/02* (2013.01)
  USPC .......................................... 180/219; 180/220

(58) Field of Classification Search
  CPC ............ B62M 23/02; F16H 3/40; F16H 9/00; Y02T 10/6226; Y02T 10/6265; Y02T 10/626
  USPC ............... 180/219, 220, 221, 230, 65.2, 65.3, 180/65.22, 69.6; 74/661
  See application file for complete search history.

(56) References Cited

U.S. PATENT DOCUMENTS

| | | | |
|---|---|---|---|
| 4,523,491 A | 6/1985 | Dittmann, Jr. | |
| 4,583,613 A | 4/1986 | Nakayama | |
| 4,635,506 A | 1/1987 | Imaizumi et al. | |
| 4,655,309 A | 4/1987 | Imaizumi et al. | |
| 4,658,661 A | 4/1987 | Terashita | |
| 4,735,105 A * | 4/1988 | Kumazawa | 74/378 |
| 4,763,538 A | 8/1988 | Fujita et al. | |
| 4,827,148 A | 5/1989 | Hirosawa et al. | |
| 4,869,332 A * | 9/1989 | Fujita et al. | 180/65.22 |
| 4,870,874 A | 10/1989 | Ito | |
| 4,923,028 A * | 5/1990 | Yamashita et al. | 180/219 |
| 4,974,695 A | 12/1990 | Politte | |
| 5,024,113 A | 6/1991 | Ito et al. | |
| 5,069,304 A * | 12/1991 | Mann | 180/221 |
| 6,054,826 A | 4/2000 | Murakami et al. | |
| 6,076,416 A | 6/2000 | Sputhe | |
| 6,267,192 B1 | 7/2001 | Maier et al. | |
| 6,457,374 B1 | 10/2002 | Shen | |
| 6,457,381 B1 * | 10/2002 | Nonaka et al. | 74/661 |
| 6,708,579 B2 | 3/2004 | Punko | |
| 7,952,305 B2 * | 5/2011 | Fischer et al. | 318/139 |
| 2003/0038437 A1 | 2/2003 | Ungvari | |
| 2004/0188163 A1 | 9/2004 | Yang | |
| 2006/0032688 A1 * | 2/2006 | Sanchez et al. | 180/219 |

FOREIGN PATENT DOCUMENTS

| | | |
|---|---|---|
| JP | 63096342 | 4/1988 |
| JP | 7010068 | 1/1995 |

* cited by examiner

*Primary Examiner* — Anne Marie Boehler
(74) *Attorney, Agent, or Firm* — Faegre Baker Daniels LLP

(57) ABSTRACT

A second drive mechanism for a vehicle. The second drive mechanism includes a motor independent of the motor that propels the vehicle. The second drive mechanism may selectively engage the transmission to propel the vehicle in either forward or reverse direction at limited speeds. In addition, the second drive mechanism may include a safety catch configured to ensure the transmission of the vehicle remains in neutral as the mechanism propels the vehicle in forward or reverse direction at limited speeds.

29 Claims, 26 Drawing Sheets

MECHANISM FOR PROPELLING A VEHICLE

FIELD OF THE INVENTION

The present disclosure pertains to a mechanism for propelling a vehicle in either a reverse or forward direction. The exemplary embodiment of the present disclosure pertains to a mechanism for propelling a motorcycle, as an example, in either a reverse or forward direction.

BACKGROUND OF THE INVENTION

Due to the weight of certain vehicles, such as motorcycles, riders may need to expend additional effort to manually move the vehicle in reverse. Often the drive mechanism of the motorcycle, including the transmission, provide for only forward movement of the motorcycle. Thus, when a rider desires to move the motorcycle in a rearward direction, oftentimes the rider must manually push the motorcycle backwards. Additionally, riders also often expend additional effort to manually move the vehicle forward when performing parking maneuvers or trailering, as controlling the drive mechanism of the motorcycle at slower speeds is often challenging.

SUMMARY OF THE INVENTION

According to one aspect of the present invention, a vehicle is provided that includes a chassis; a traction device adapted to contact the ground and propel the chassis; a first motor supported by the chassis; and a transmission adapted to selectively transfer power from the first motor to the traction device. The transmission has at least one engaged state in which drive power is transferred from the first motor to the traction device to propel the chassis in a substantially forward direction. The transmission has at least one disengaged state preventing drive power from being transferred from the first motor to the traction device. The vehicle further includes a member configured to selectively retain the transmission in the disengaged state and a second motor supported by the chassis that powers the traction device to propel the chassis in at least one of a substantially rearward direction and a substantially forward direction when the member retains the transmission in the disengaged state.

According to another aspect of the present invention, a vehicle is provided that includes a chassis; a traction device adapted to contact the ground and propel the chassis; an internal combustion engine supported by the chassis; a transmission adapted to selectively transfer power from the internal combustion engine to the traction device to provide substantially forward motion; an electric motor supported by the chassis that provides power to the traction device to provide at least one of a substantially rearward motion and a substantially forward motion; and a controller configured to limit operation of the electric motor to when the internal combustion engine is operating.

According to another aspect of the present invention, a vehicle is provided that includes a chassis; a straddle-type seat supported by the chassis; and a traction device adapted to contact the ground and propel the chassis. The traction device has an axis of rotation oriented in a substantially fixed position relative to the chassis. The vehicle further includes a first motor supported by the chassis and a transmission configured to transfer power from the first motor to the traction device to create rotation of the traction device about the axis of rotation in a first direction. The transmission includes a housing and an external shaft extending from the housing in a direction substantially parallel to the axis of the traction device. The vehicle further includes a second motor supported by the chassis and providing power to rotate the traction device about the axis of rotation in at least one of the first direction and a second direction. The second direction is opposite of the first direction.

The above mentioned and other features of this invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless otherwise stated herein, the figures are proportional.

DESCRIPTION OF THE PREFERRED EMBODIMENTS

The embodiments disclosed below are not intended to be exhaustive or to limit the invention to the precise forms disclosed in the following detailed description. Rather, the embodiments are chosen and described so that others skilled in the art may utilize their teachings.

Figure 1:
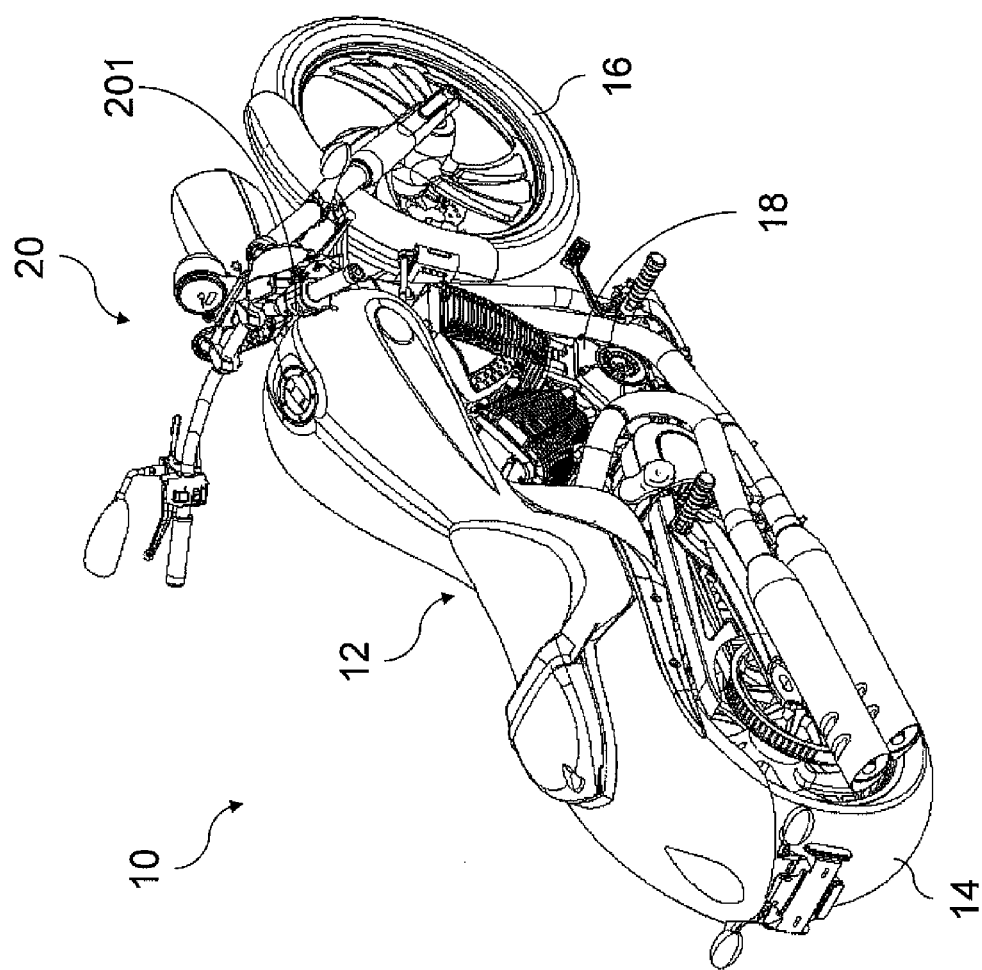
FIG. 1 is a perspective view of a motorcycle showing the motorcycle including a pair of wheels, a chassis, and an engine that propels the wheels.

Referring now to FIG. 1, a perspective view of a vehicle 10 is provided. Although vehicle 10 is shown and referred to as a motorcycle in the description and figures, the present invention is not limited to usage with motorcycles and may be employed on any type of suitable vehicle, such as ATV's, snowmobiles, and other vehicles. Preferred vehicle 10 is powered to move in both forward and reverse directions as described below.

Motorcycle 10 includes a chassis 12, a first traction device or rear wheel 14, a second traction device or front wheel 16, a first motor 18, and a steering assembly 20. Chassis 12 is the frame of motorcycle 10 and is configured to support various components of motorcycle 10, such as first motor 18, on first and second traction devices 14, 16. In other embodiments, traction devices 14, 16 may comprise any device suitable for the type of vehicle, such as skids or a tread configured for use on a snowmobile, for example.

In the preferred embodiment, first motor 18 provides power to move preferred motorcycle 10 in a forward direction. First motor 18 is shown and referred to as an internal combustion engine 18. In other embodiments, first motor 18 may be any type of power source suitable for use in a vehicle, such as an electric motor, for example. Similarly, steering assembly 20 may including any suitable steering mechanisms, such as handle bars, a steering wheel, joystick, or other known steering mechanisms.

Figure 2:
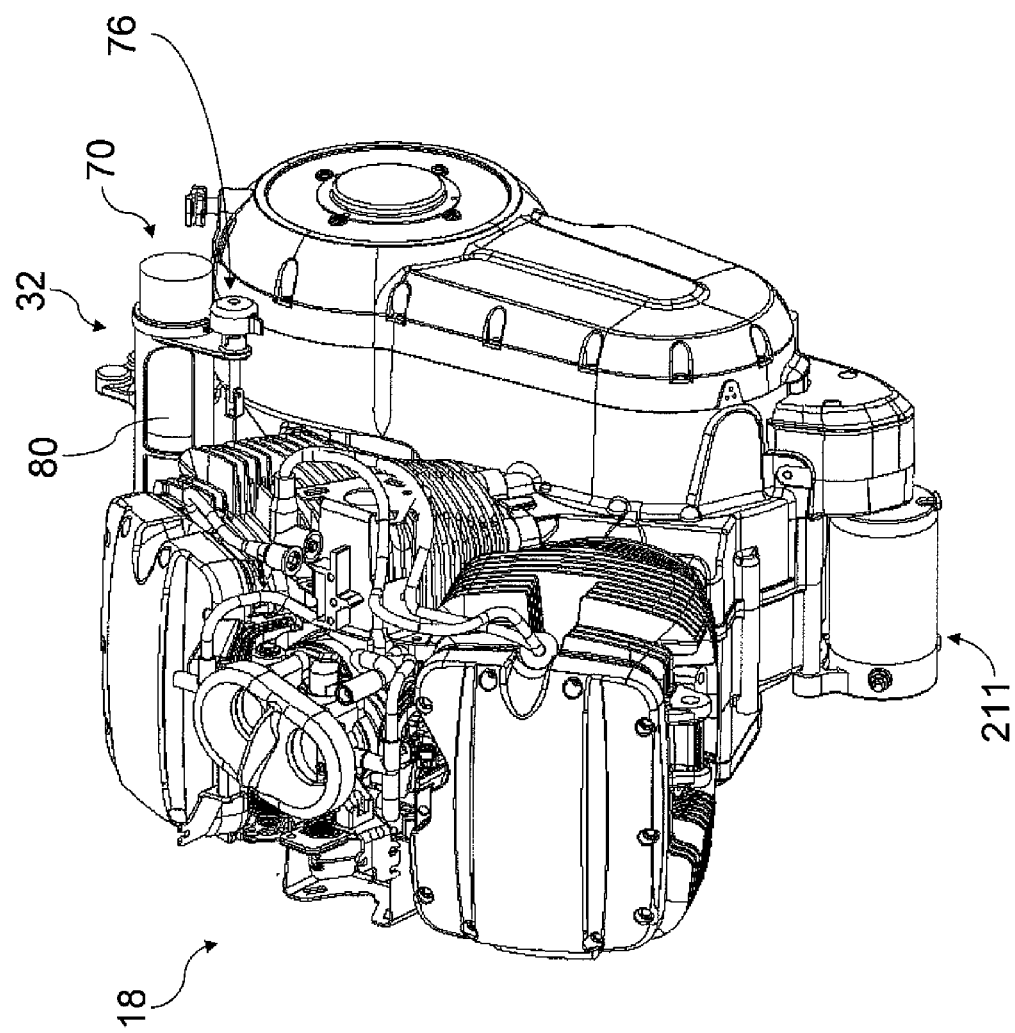
FIG. 2 a perspective view of the engine, transmission, and second drive mechanism of the motorcycle.
Figure 3:
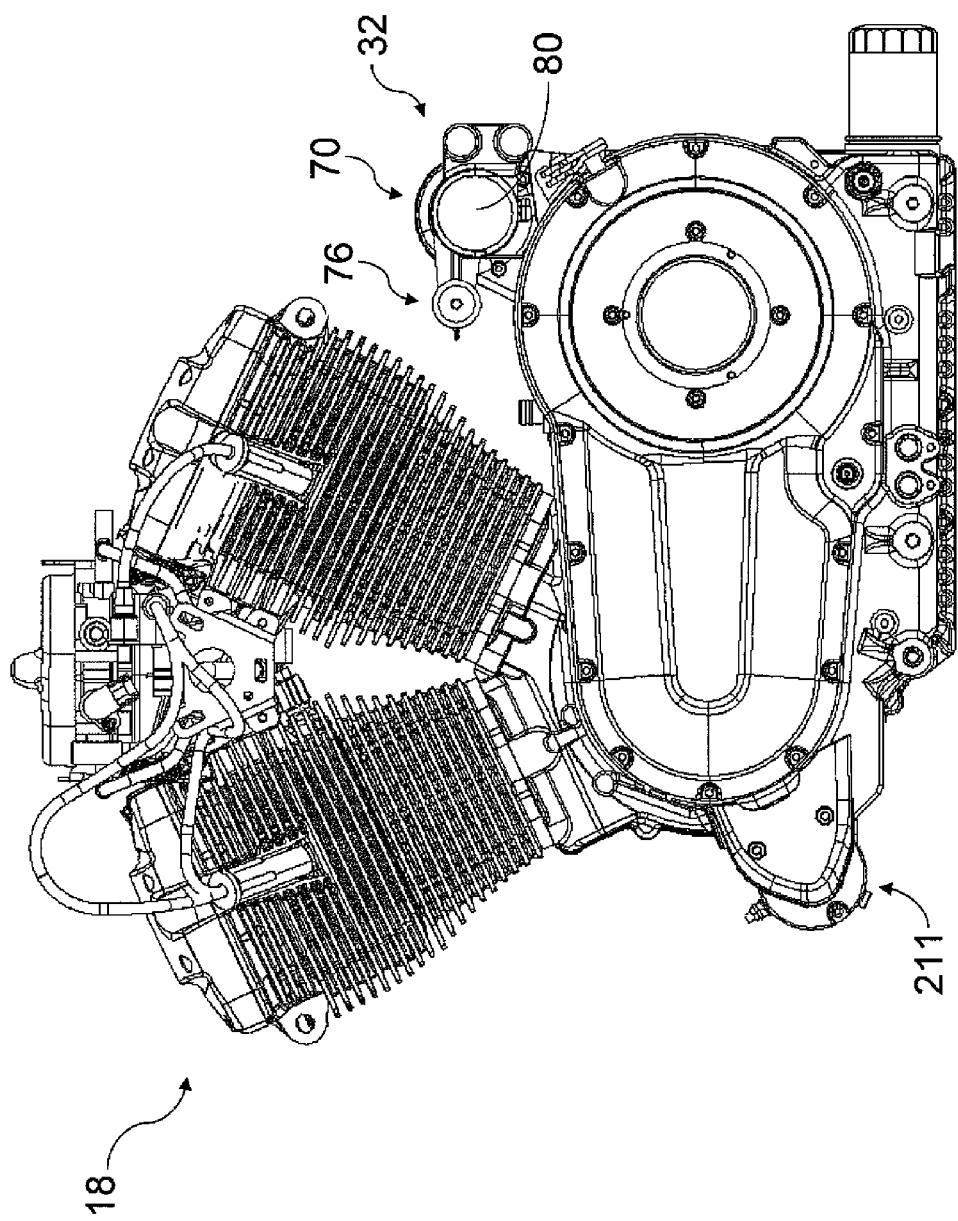
FIG. 3 is a side view of the engine, transmission, and second drive mechanism of the motorcycle.
Figure 4:
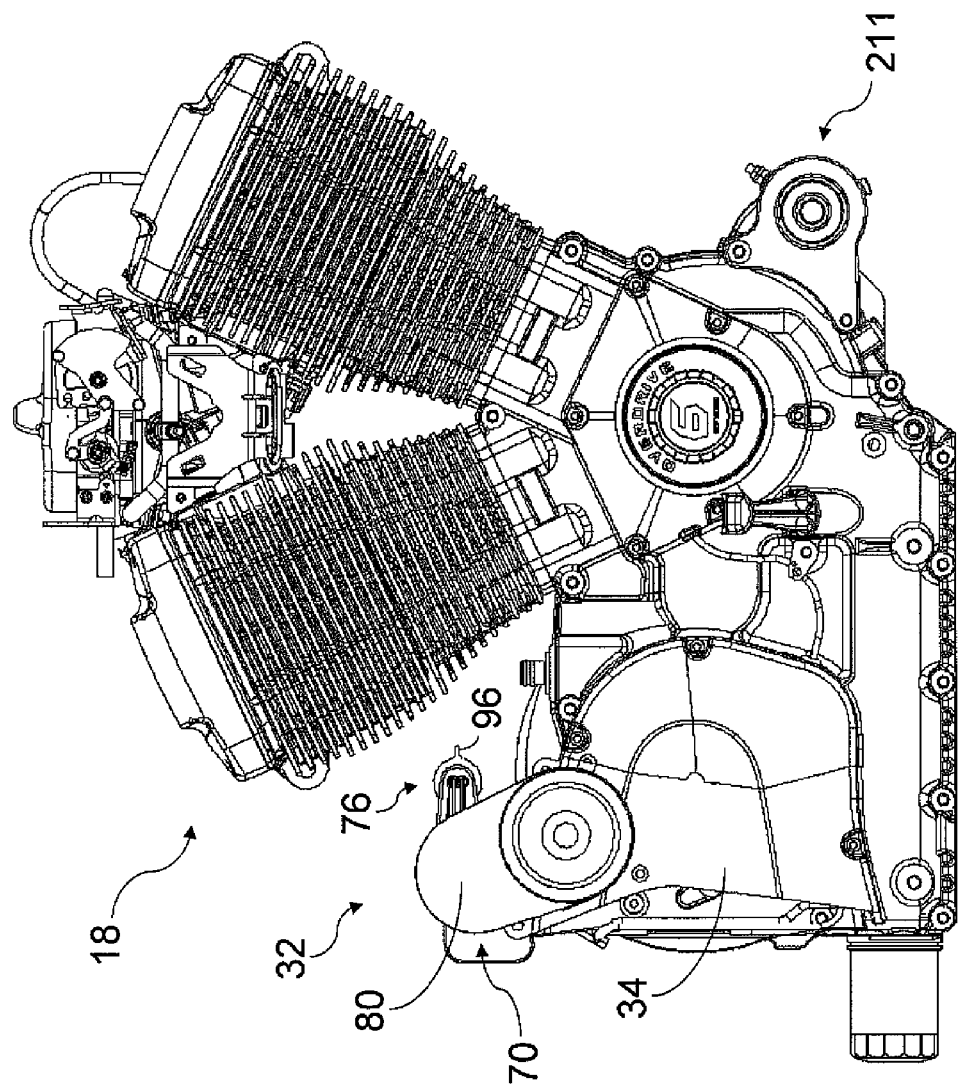
FIG. 4 is an opposite side view of the engine, transmission, and second drive mechanism of the motorcycle.
Figure 5:
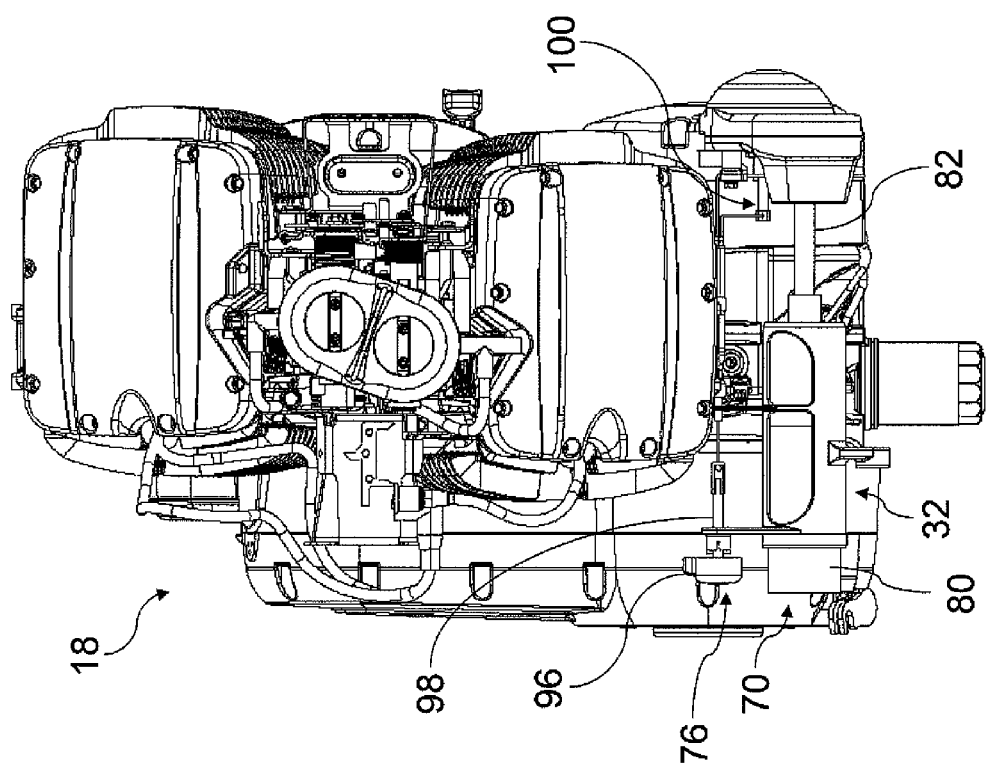
FIG. 5 is a top view of the engine, transmission, and second drive mechanism of the motorcycle.

FIGS. 2 through 19 depict the exemplary embodiment of motorcycle 10 with various components omitted for the sake of illustration. For example, in FIG. 2, portions of chassis 12, and traction devices 14, 16, all depicted in FIG. 1, have been omitted to more clearly depict engine 18. In addition, as shown generally in FIGS. 2-19, motorcycle 10 may further include a transmission 30 and a second drive mechanism 32. Transmission 30 may be any transmission known in the art suitable for use in motorcycle 10 or other vehicles including the gear transmission discussed below, CVT's, and other suitable transmissions.

Figure 6:
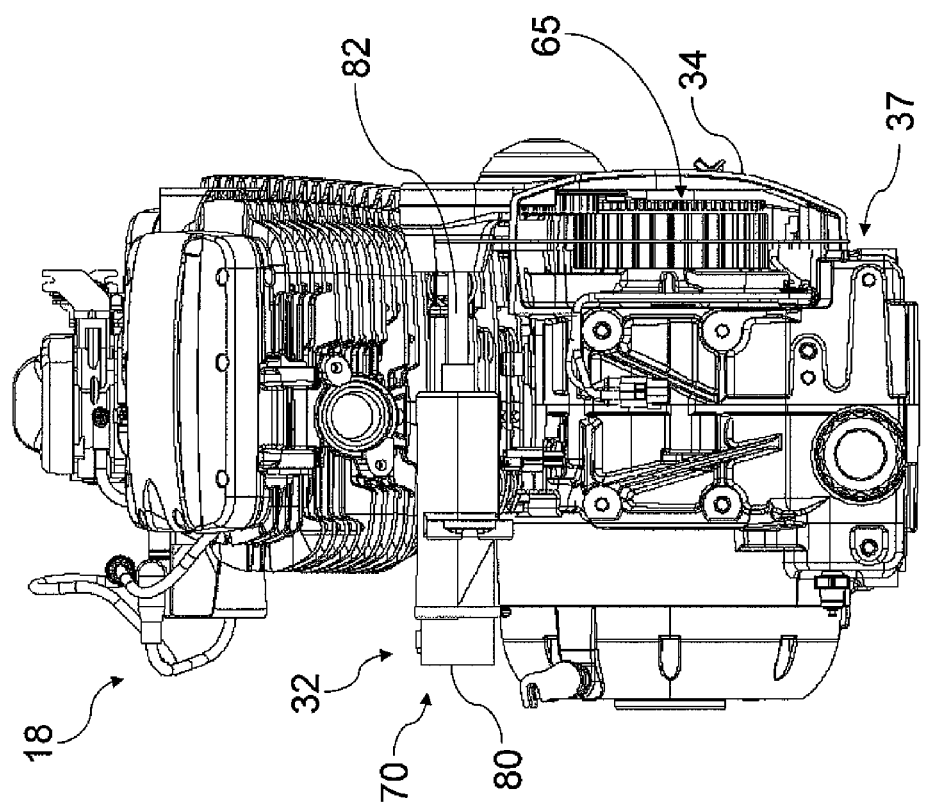
FIG. 6 is a rear view of the engine, transmission, and second drive mechanism of the motorcycle.
Figure 7:
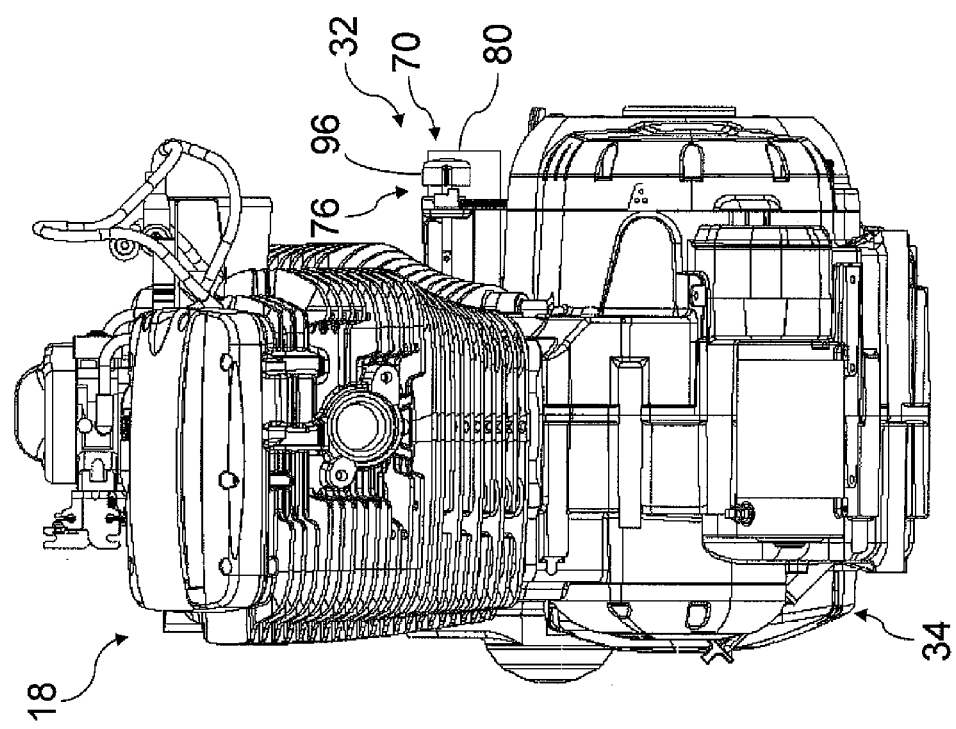
FIG. 7 is a front view of the engine, transmission, and second drive mechanism of the motorcycle.
Figure 8:
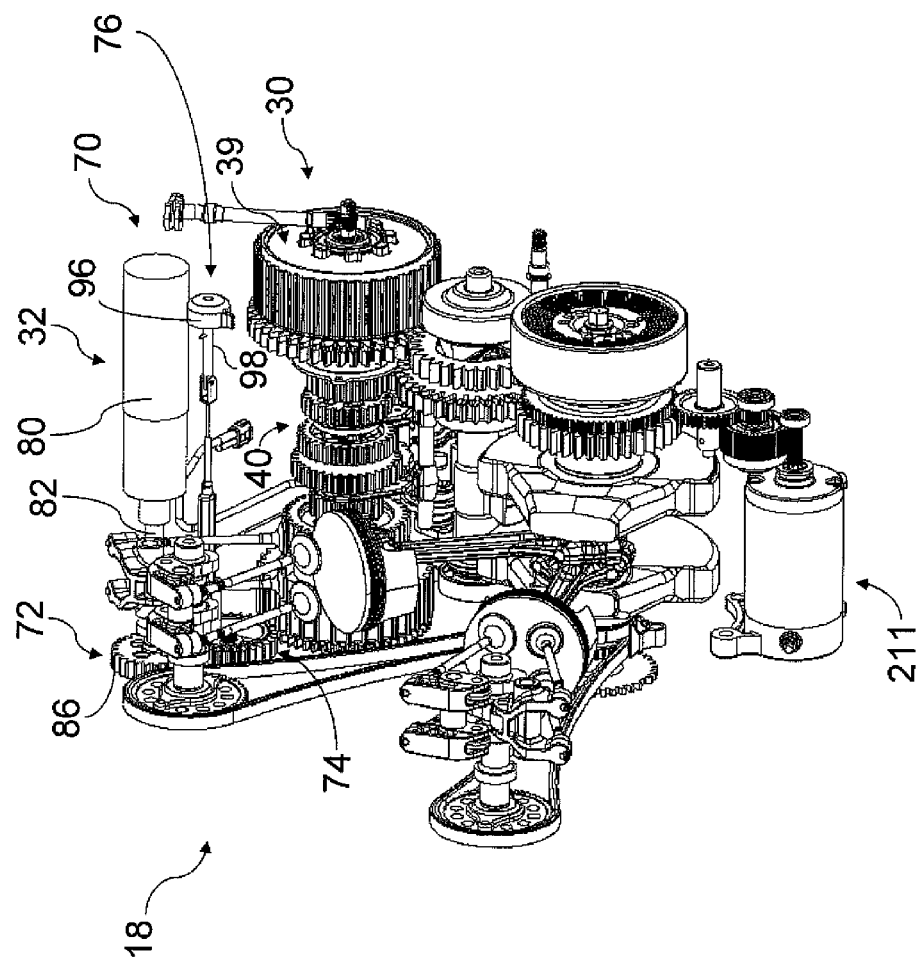
FIG. 8 is a perspective view of several internal components of the engine, transmission, and second drive mechanism of the motorcycle.
Figure 9:
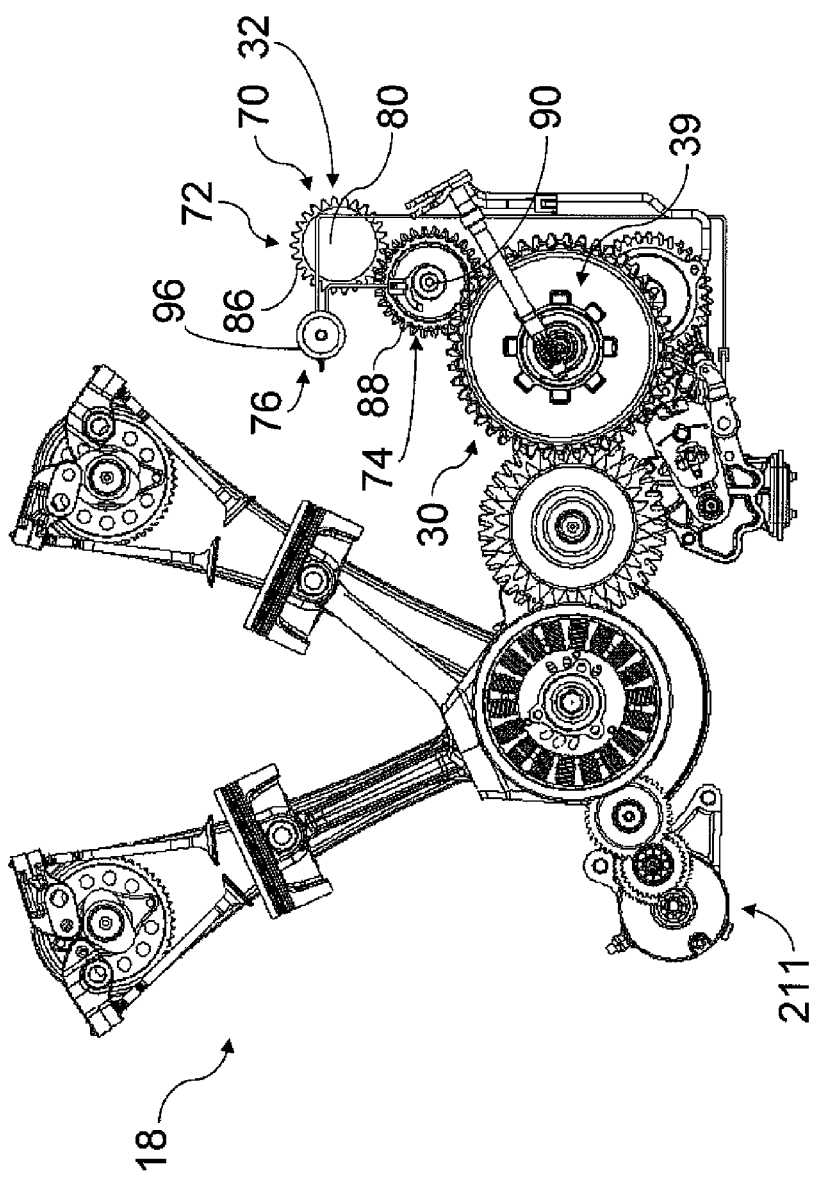
FIG. 9 is a side view of the several internal components of the engine, transmission, and second drive mechanism of the motorcycle.
Figure 10:
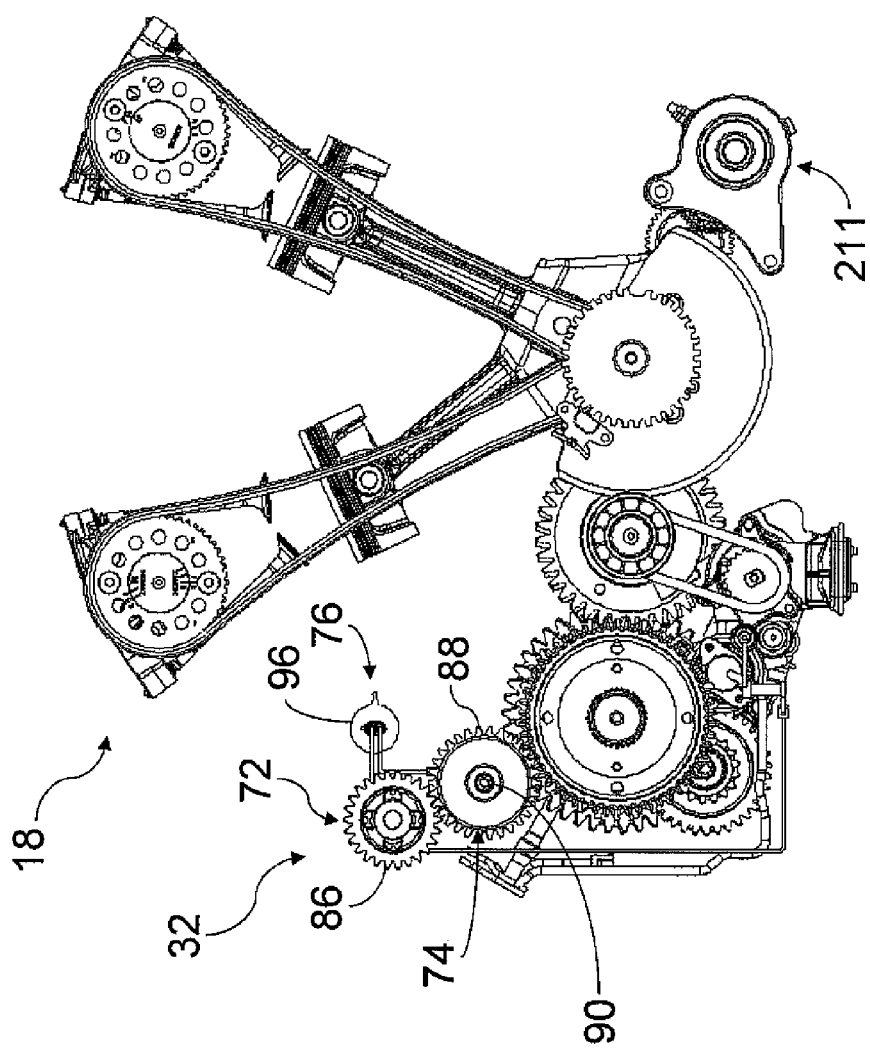
FIG. 10 is a opposite side view of the several internal components of the engine, transmission, and second drive mechanism of the motorcycle.
Figure 11:
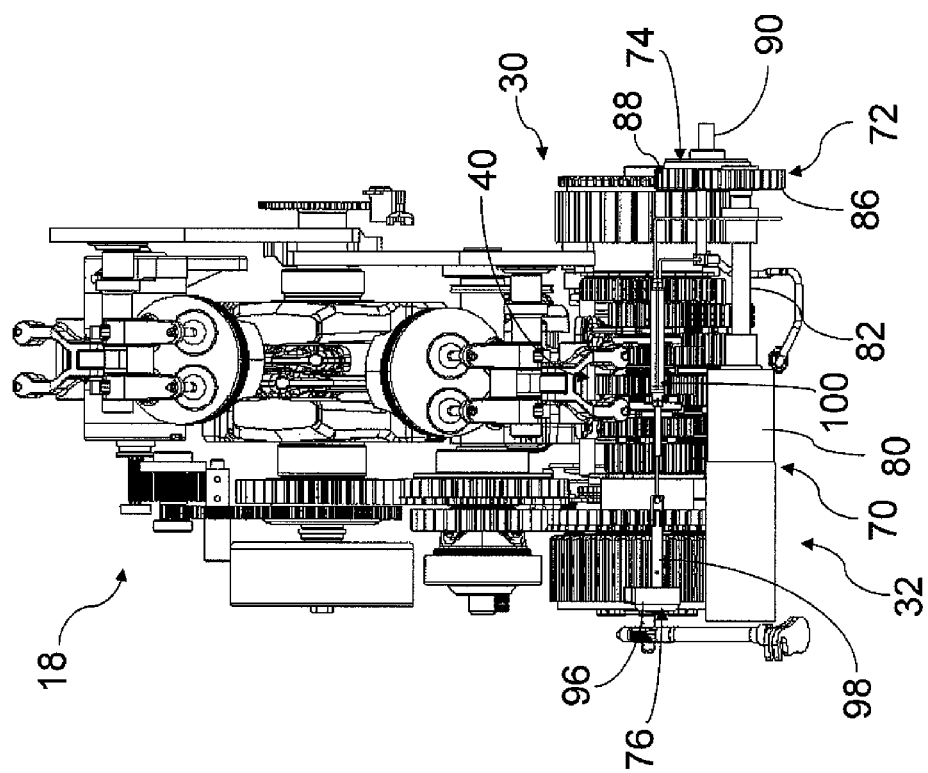
FIG. 11 is a top view of the several internal components of the engine, transmission, and second drive mechanism of the motorcycle of the motorcycle.

As shown in FIG. 8-16, illustrated transmission 30 includes a clutch 39 driven by engine 18, several pairs of aligned transmission gears 40, a shift drum 44, a plurality of shift forks 46, and a plurality of shift fork shafts 48. Each gear 40 includes a plurality of teeth 50, formed in its outer surface. These components are enclosed in a housing 37 as shown in FIG. 6.

Figure 18:
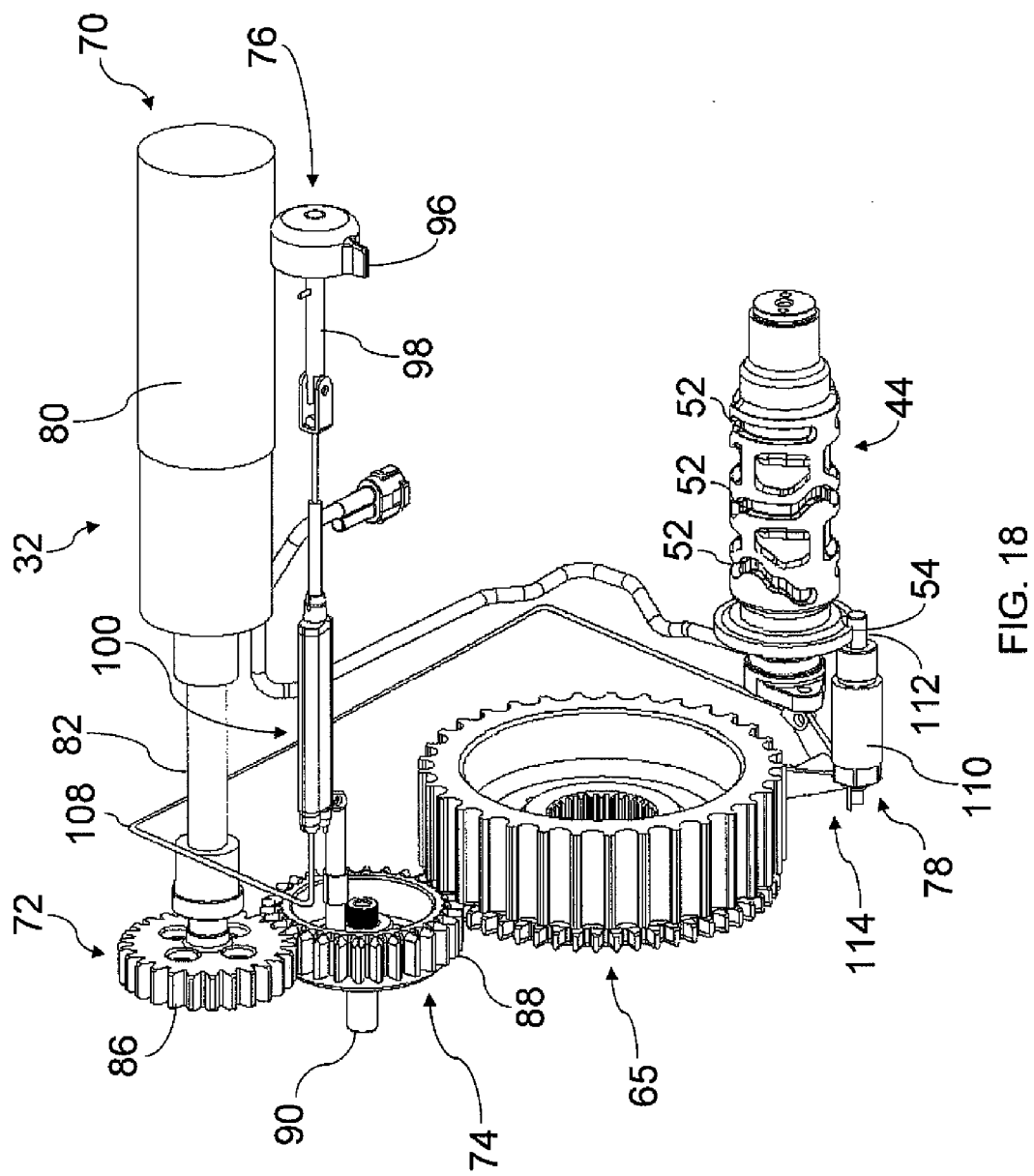
FIG. 18 is a perspective view of the second drive mechanism including a knob assembly that interacts with the transmission showing an intermediate engagement gear engaging a motor gear of the second drive mechanism with an output sprocket gear of the transmission.
Figure 20:
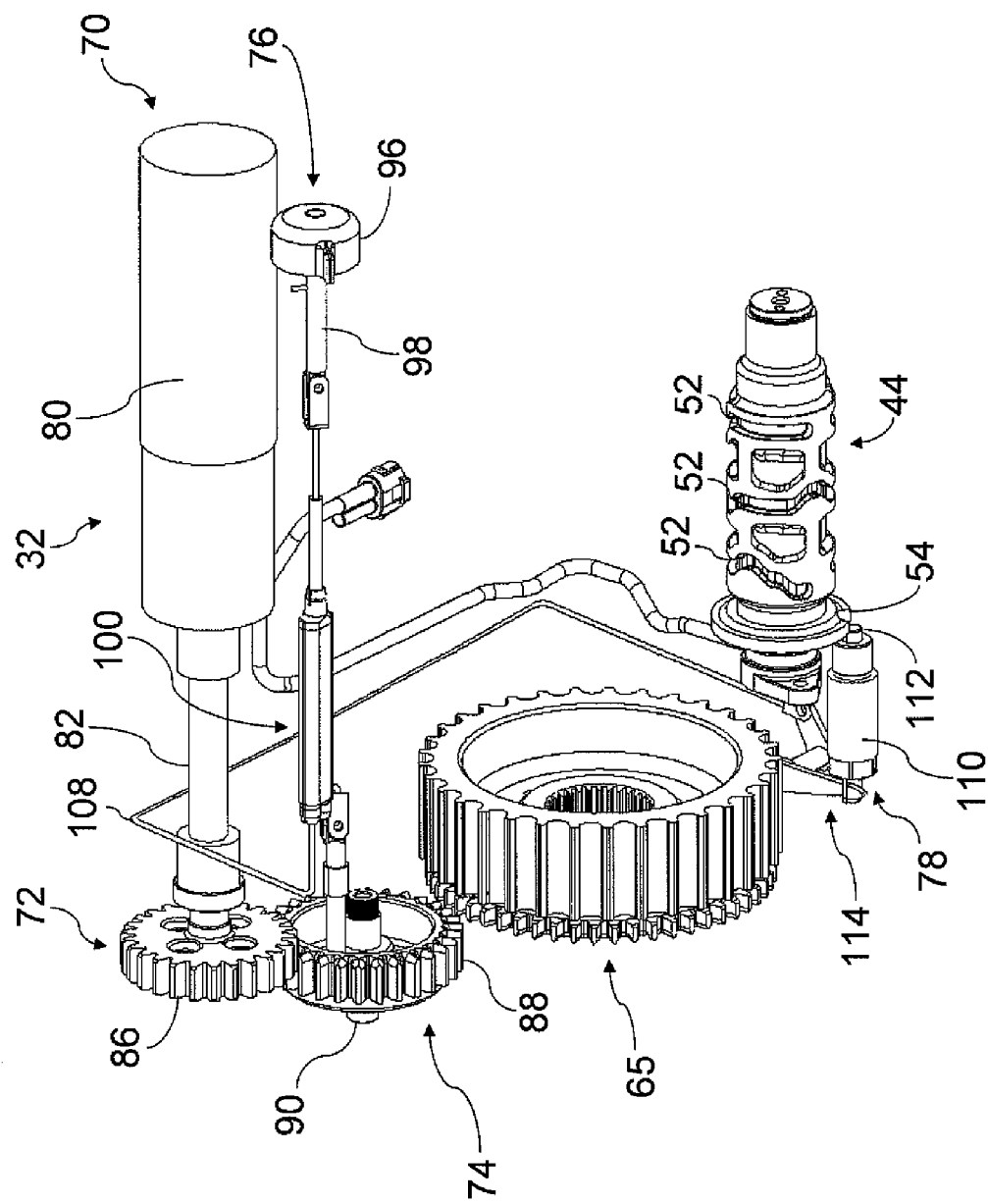
FIG. 20 is a view similar to FIG. 18 showing the knob assembly moving the intermediate engagement gear so the motor gear is no longer engaged with the sprocket gear of the transmission.

As shown in FIGS. 18 and 20, shift drum 44 includes a plurality of races 52 and a receiving area or notch 54. Shift forks 46 may have any suitable configuration and may be configured to engage gears 40 and shift drum 44. For example, shift forks 46 may include portions (not shown) that ride within races 52 of shift drum 44. The mating of forks 46 with gears 40 determine which of gears 40 of transmission 30 will ultimately drive at least one traction device 14, 16.

Each of forks 46 includes receiving portions 56 that receive shift fork shaft 48. Fork shaft 48 extends through receiving portions 56 of forks 46 in a manner allowing forks 46 to substantially traverse shaft 48 whenever a race 52 of drum 44 asserts pressure upon the portions of forks 46 located within races 52.

Transmission 30 further includes a gear shift assembly 58 that shifts transmission 30 from one gear to the next. Gear shift assembly 58 includes an input shaft 60 and a mating portion 62. Mating portion 62 interacts with drum 44 to allow for the rotation of shaft 60 to cause rotation of drum 44. Gear shift assembly 58 may include additional components (not shown) that allow an operator to control assembly 58. For example, a foot pedal (not shown) may be connected to input shaft 60 of gear shift assembly 58 to allow an operator to select gears 40 that are engaged by shift forks 46 by utilizing the foot pedal to rotate drum 44 via assembly 58. Clutch 39 disengages engine 18 from gears 40 during shifting.

Transmission 30 includes an output shaft 63 coupled to an output sprocket 65. Output shaft 63 is substantially parallel to the axis of rotation of rear wheel 14. A portion of output shaft 63 extends outside of transmission housing 37 into a cover 34 coupled to housing 37. Similarly, output sprocket gear 65 is positioned outside of transmission housing 37 within cover 34 as shown in FIG. 6. A belt or chain extends rearward from sprocket 65 and cover 34 to rear wheel 14 to propel motorcycle 10.

According to the preferred embodiment, engine 18 only drives motorcycle 10 in the forward direction. Second drive mechanism 32 is provided to assist in driving motorcycle 10 in either forward or reverse direction at limited speeds.

As shown in FIG. 18, second drive mechanism 32 includes a second motor 70 mounted on transmission housing 37, a motor gear 72, an engagement gear 74, a knob or control assembly 76, and a safety catch 78. In the preferred embodiment, second motor 70 provides the power to move motorcycle 10 in either a reverse or forward direction; knob assembly 76 controls engagement and disengagement of second motor 70 with transmission 30; and safety catch 78 prevents transmission 30 from moving from a neutral position when second motor 70 is engaged with transmission 30. In alternative embodiments second motor 70 could be mounted anywhere on engine 18 or chassis 12. In the exemplary embodiment, second motor 70 operably connects to the output of transmission 30 prior to connection of a belt or chain extending rearward to rear wheel 14 to propel motorcycle 10.

Figure 16:
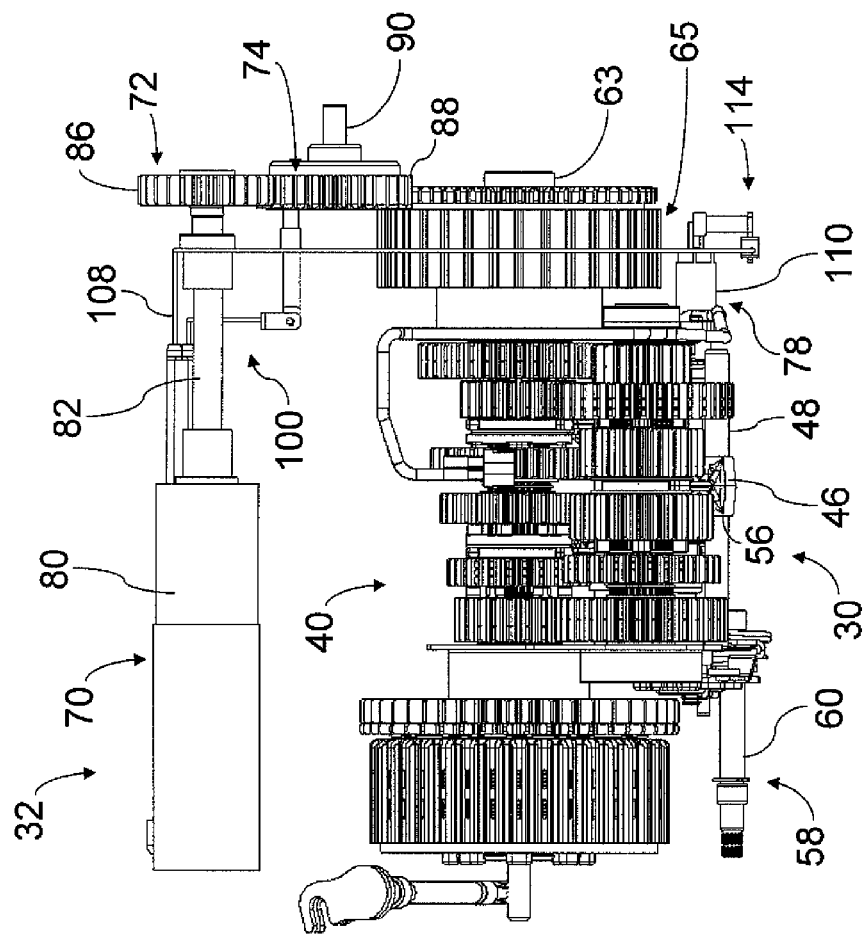
FIG. 16 is a rear view of several internal components of the transmission and second drive mechanism of the motorcycle.
Figure 17:
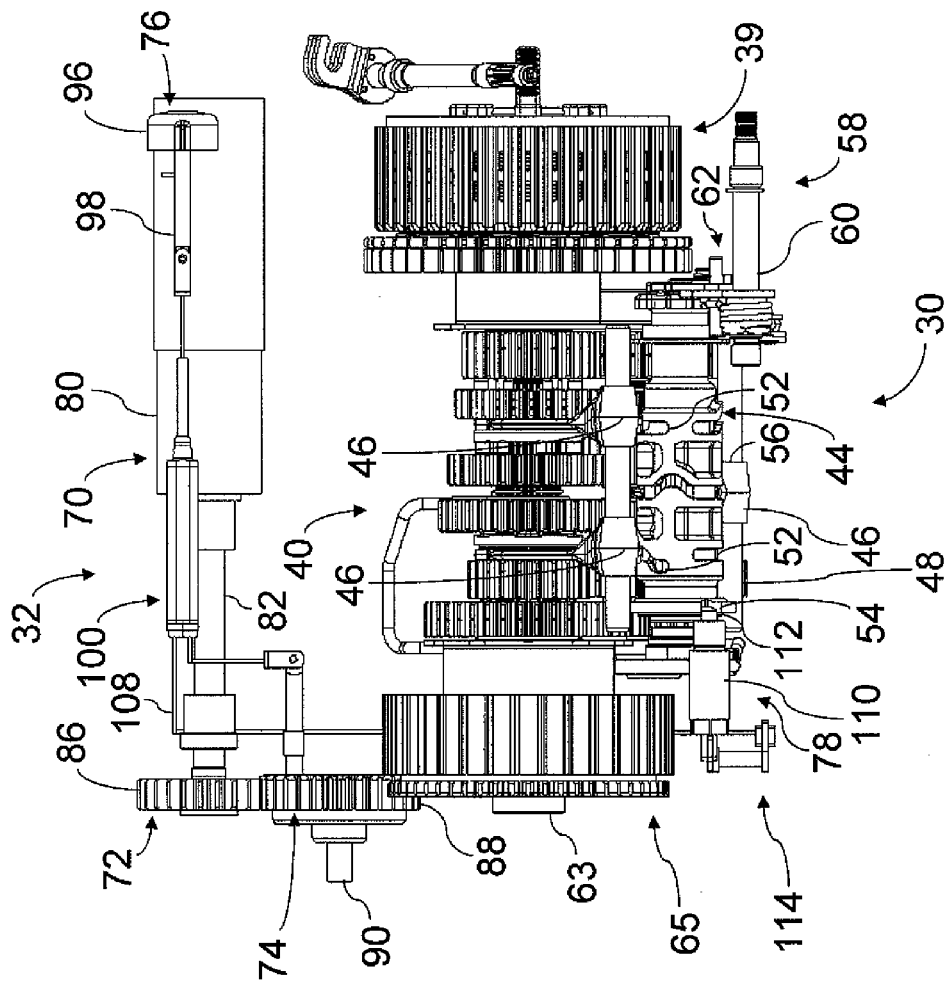
FIG. 17 is an front view of several internal components of the transmission and second drive mechanism of the motorcycle.

Preferred second motor 70 is shown in the figures and referred to as an electric motor (DC, AC, or any other type of electric motor), but in other embodiments, second motor 70 may be a hydraulic motor, a compressed air motor, an internal combustion engine, or other known power sources. Second motor 70 includes a motor body 80 and a motor shaft 82. Motor body 80 generally houses the internal electrical and mechanical components (not shown) of motor 70. Motor shaft 82 extends away from motor body 80 and is driven by the internal electrical components. In general, motor shaft 82 is configured to rotate about its longitudinal axis that is substantially parallel to output shaft 63 of transmission 30 as shown in FIG. 16. In some embodiments, motor 70 may be mounted at any angle with respect to output shaft 63 of transmission 30. Motor 70 may be activated in any suitable manner, such as upon receiving an electrical signal, for example from a microcontroller, switch, or other suitable input as described in greater detail below.

Preferred motor gear 72 includes a plurality of teeth 86 and a receiving area (not shown) configured to receive at least a portion of motor shaft 82. The receiving area of motor gear 72 may be connected to motor shaft 82 in any suitable manner including splines, keys and keyways, or press fits. Motor gear 72 may also be integral with motor shaft 82.

Engagement gear 74 includes a plurality of teeth 88 formed in the outer surface of gear 74 that mate with teeth 86 of motor gear 72. A support shaft 90 extends through and supports engagement gear 74. Shaft 90 is sized and configured to allow engagement gear 74 to rotate upon shaft 90 and slide upon shaft 90 in a manner allowing engagement gear 74 to traverse along shaft 90 when desired. Shaft 90 is positioned in a parallel relationship to output shaft 63 of transmission 30 and engagement gear 74 interconnects or engages motor gear 72 with transmission 30 whenever engagement gear 74 is properly aligned with motor gear 72 and output sprocket gear 65 of transmission 30. When engagement gear 74 is not so aligned, engagement gear 74 will not engage at least one of motor gear 72 or the output sprocket gear 65 of transmission 30. Engagement gear 74 may also be integral to shaft 90 such that both engagement gear 74 and shaft 90 slide axially together allowing interconnection of motor gear 72 with transmission 30.

As shown in FIG. 18, knob assembly 76 includes a knob 96, a shaft 98, and a linkage 100. Knob 96 receives a portion of shaft 98 so that knob 96 controls movement of shaft 98. A set screw or similar mechanism (not shown) may be utilized to ensure that once shaft 98 is located within knob 96, movement of knob 96 will create movement of shaft 98. Additionally control or knob assembly 76 can comprise any electric or mechanical system that controls engagement and disengagement of second motor 70 with transmission 30 and controls movement of safety catch 78 preventing transmission 30 from moving from a neutral position when second motor 70 is engaged with transmission 30. For example, control assembly may comprise a push button that powers a solenoid providing the motion to the linkages.

Figure 13:
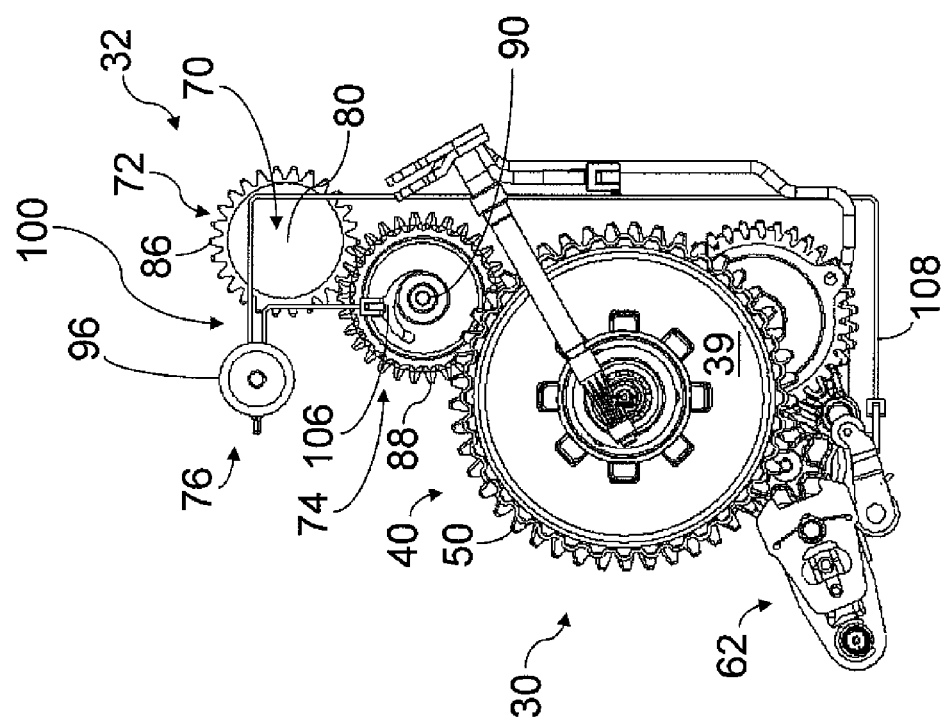
FIG. 13 is a side view of several internal components of the transmission and second drive mechanism of the motorcycle.
Figure 14:
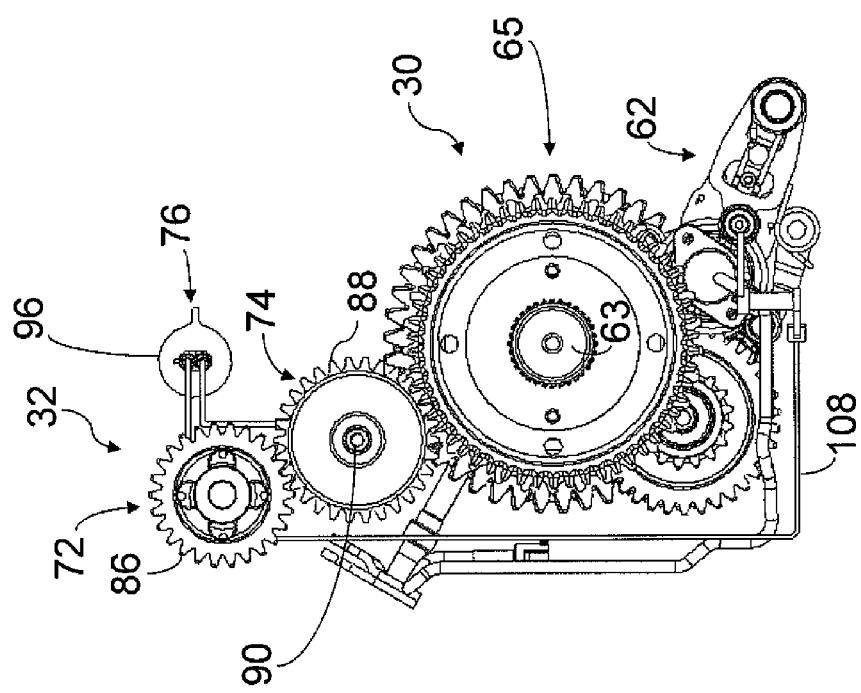
FIG. 14 is a opposite side view of several internal components of the transmission and second drive mechanism of the motorcycle.
Figure 15:
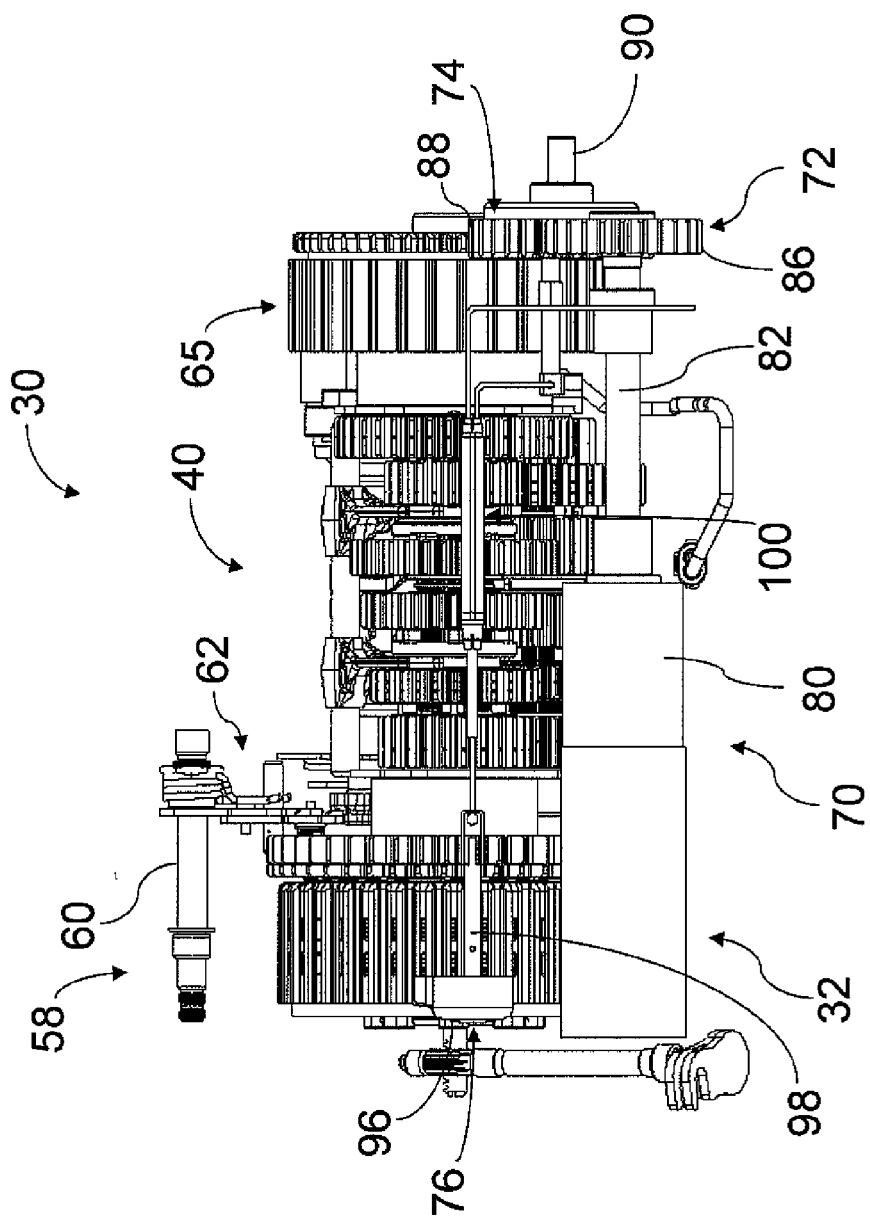
FIG. 15 is a top view of several internal components of the transmission and second drive mechanism of the motorcycle.

Linkage 100 includes a push-pull cable 108 that connects to both engagement gear 74 and shaft 98. Linkage 100 may be connected to engagement gear 74 in any suitable manner that provides that linkage 100 does not interfere with necessary rotation of engagement gear 74 about shaft 90. Preferably any such linkage 100 creates translational movement of engagement gear 74 along shaft 90 when desired. As shown in FIG. 13, linkage 100 may include a crescent-shaped member 106 positioned to engage gear 74. Rotation of knob 96 controls movement of engagement gear 74 as described in greater detail below.

Figure 12:
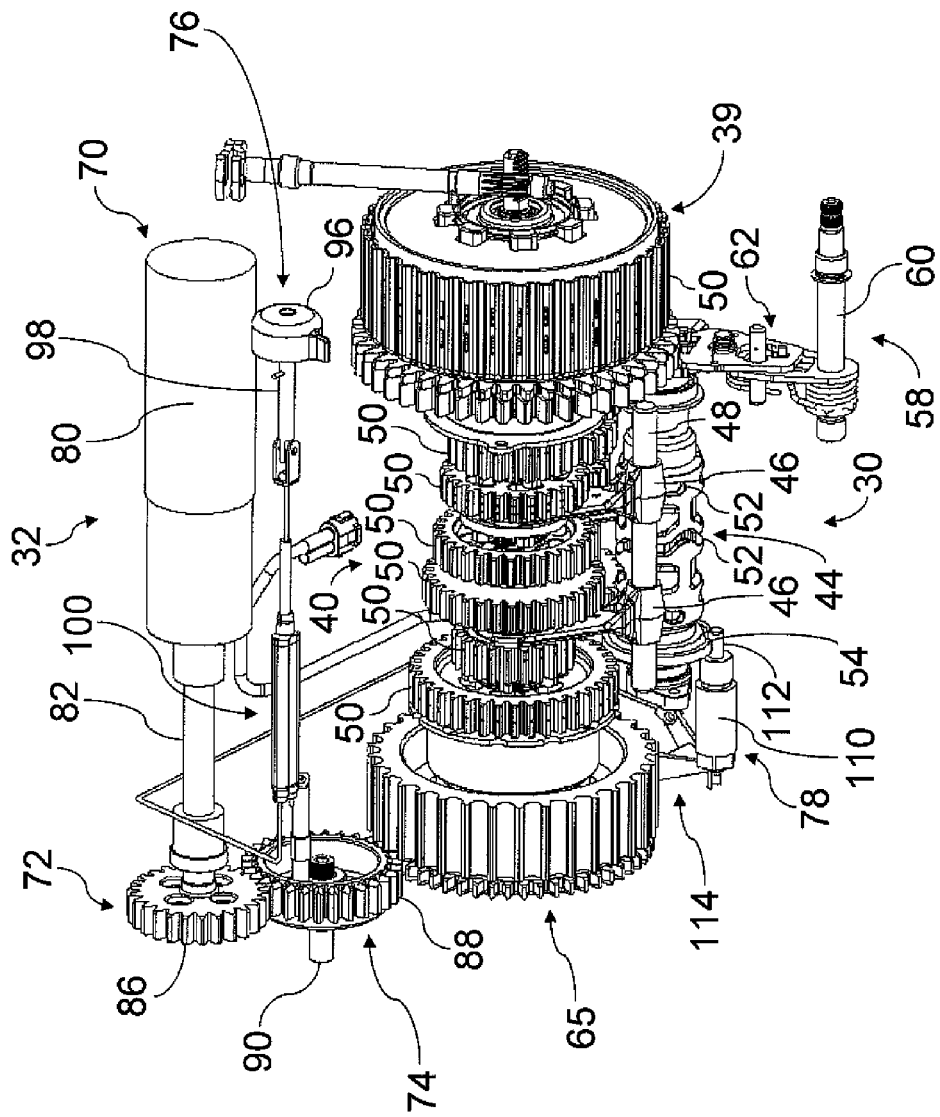
FIG. 12 is a perspective view of several internal components of the transmission and the second drive mechanism of the motorcycle.

Knob 96 also controls movement of safety catch 78. As shown in FIG. 12, safety catch 78 includes a body portion 110 mounted on housing 37, an extension member 112, and a control linkage 114. Knob 96 controls the position of control linkage 114 that determines how far extension member 112 extends outward from body portion 110. The amount of extension of member 112 controls the ability of shift drum 44 to rotate from the neutral position.

Figure 19:
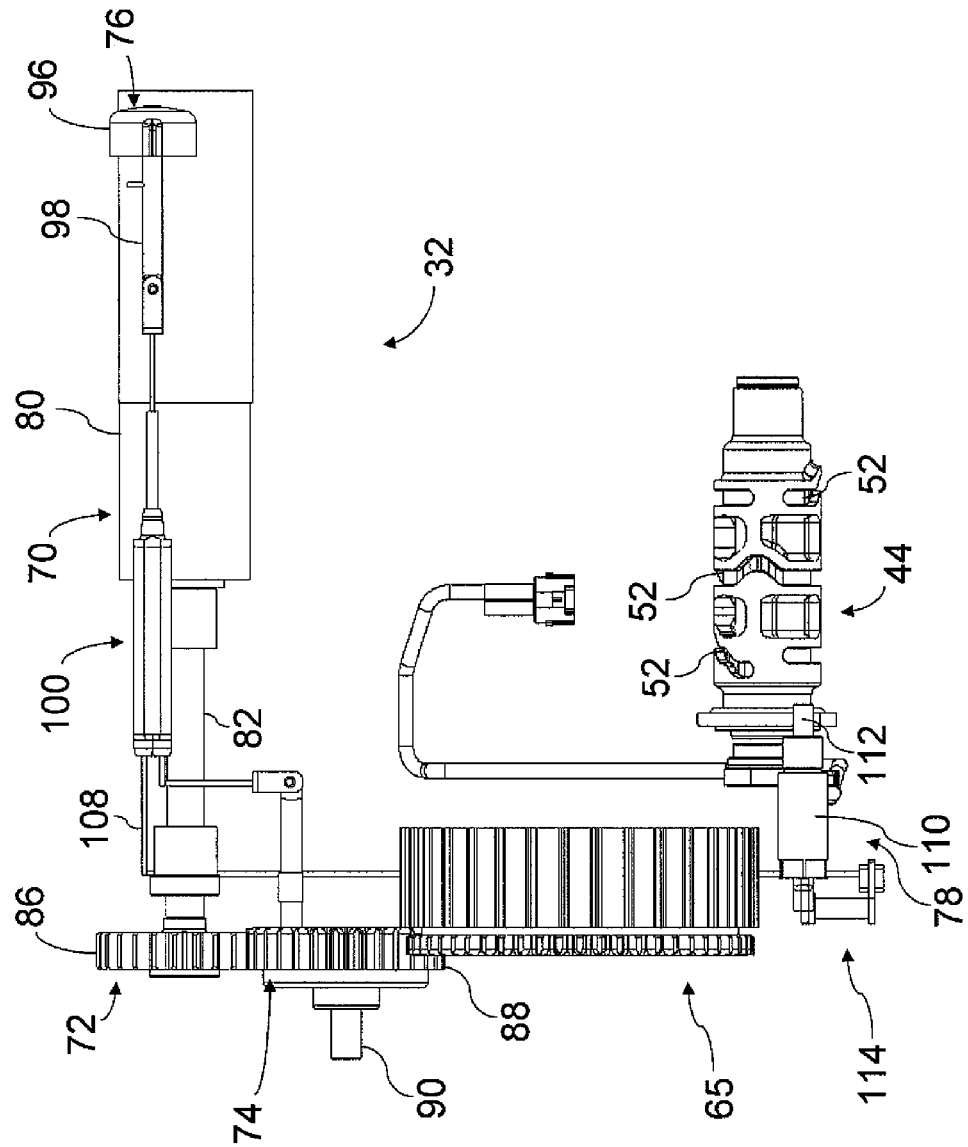
FIG. 19 is a front view of the second drive mechanism showing the intermediate engagement gear engaging the motor gear with the output sprocket gear.
Figure 21:
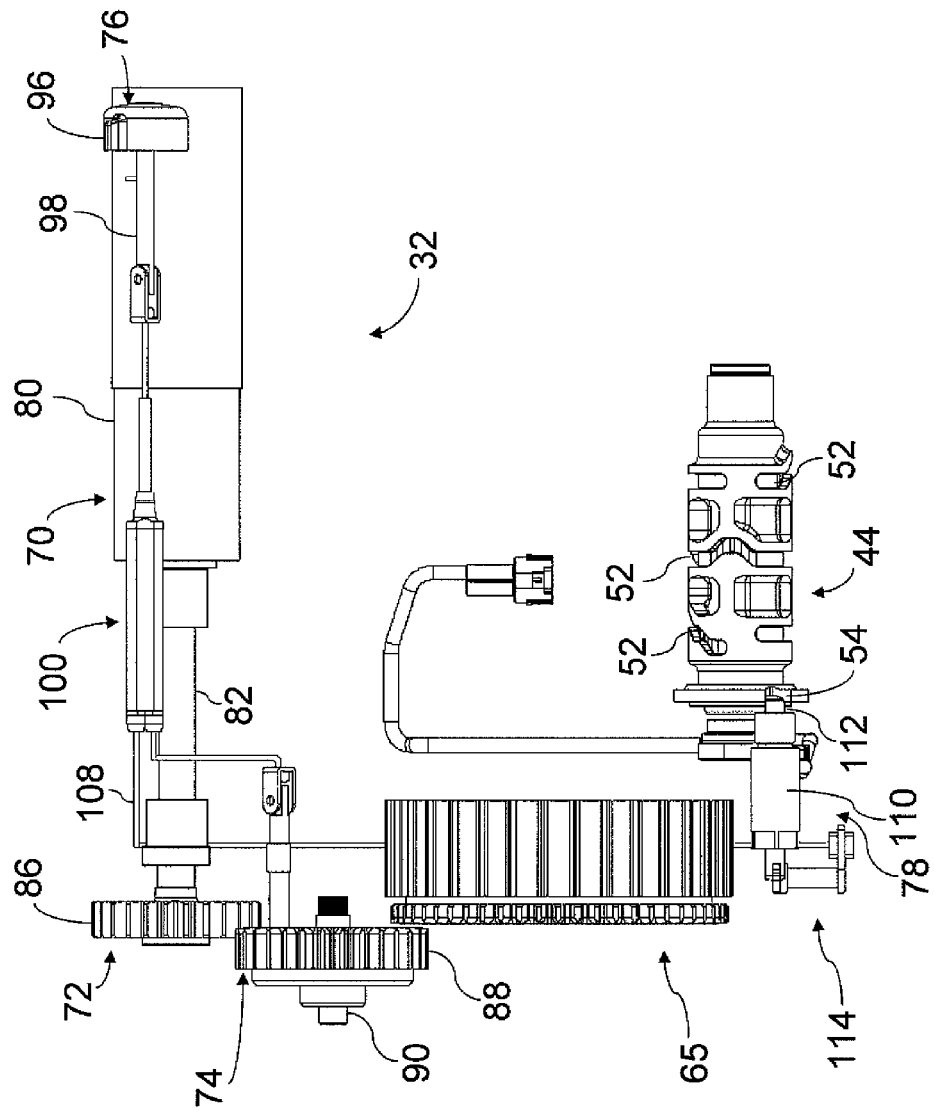
FIG. 21 is a view similar to FIG. 19 showing the intermediate engagement gear no longer providing engagement between the motor gear and the sprocket gear.

When control portion 114 is located in a first position with respect to body portion 110, extension member 112 will extend fully from body portion 110 as shown in FIG. 19 and blocks rotation of drum 44 from the neutral position. Extension member 112 compliments notch 54 of shift drum 44, thereby allowing notch 54 to receive extension member 112 and block rotation of drum 44 from the neutral position. When control portion 114 is located at a second position with respect to body portion 110, substantially less of extension member 112 extends from body portion 110 as shown in FIG. 21 so that drum 44 can rotate from the neutral position. Extension member 112 need not be fully withdrawn into body portion 110 when control portion 114 is located in the second position, but rather, extension member 112 may only be partially withdrawn into body portion 110. In some embodiments, when control portion 114 is actuated, extension member 112 rotates to align with notch 54 of drum 44. In other embodiments, when control portion 114 is actuated extension member 112 both rotates and translates axially to align with notch 54 of drum 44. Alternatively, an aperture in drum 44 may be instituted in place of notch 54 such that extension member is received within the aperture to block rotation of drum 44 from the neutral position. In these embodiments, catch 78 comprises a member that engages with shift drum 44 to prohibit rotation of drum 44 from the neutral position.

Linkage 100 include a push-pull cable 108 connected to control linkage 114. Other mechanisms capable of communicating movement from linkage 100 to control linkage 114 may also be used. In general, cable 108 converts movement of knob 96 into movement of control linkage 114 and extension member 112 relative to body portion 110.

Accordingly, rotation of knob 96 causes movement of control portion 114 with respect to body portion 110 while also creating translational movement of engagement gear 74 along shaft 90. Thus, the rotation of knob 96 also controls the relative position of extension member 112 with respect to body portion 110.

Referring now to FIGS. 18 and 19, second drive mechanism 32 is shown in the second drive state. When knob 96 is in a first position as shown, second drive mechanism 32 is in the second drive state. When in second drive state, second drive mechanism 32 may be activated to rotate motor 70 in either forward or reverse direction. Motor 70 may be controlled in any suitable manner, such as upon receiving an electrical signal, for example from a microcontroller, switch, or other suitable input as described in greater detail below. Linkage 100 moves engagement gear 74 into a position allowing engagement gear 74 to engage motor gear 72 and sprocket gear 65 of transmission 30. In addition, linkage 100 also moves control portion 114 into a position with respect to body portion 110 that results in full extension of extension member 112 away from body portion 110 to block movement of drum 44 from the neutral position.

Preferably, second drive mechanism 32 only moves into the second drive state when transmission 30 is in the neutral or disengaged state. Specifically, notch 54 of drum 44 only aligns with extension member 112 when drum 44 is rotated to its neutral position. Accordingly, drum 44 must be in the neutral position to receive extension member 112. Furthermore, whenever drum 44 is not in the neutral state, drum 44 will have been rotated into a position differing from that depicted in FIGS. 18 and 19, and thus notch 54 will not align with extension member 112. Accordingly, drum 44 will prevent second drive mechanism 32 from being moved into the second drive state since drum 44 will substantially prevent any extension of extension member 112 from body portion 114. Accordingly, transmission 30 must be in neutral for second drive mechanism 32 to be moved into the second drive state.

FIGS. 20 and 21 depict second drive mechanism 32 in the non-second drive state and transmission 30 in the neutral state. In comparing the position of knob 96 in FIGS. 18 and 19 to the position of knob 96 in FIGS. 20 and 21, knob 96 has been rotated into the non-second drive state position shown in FIGS. 20 and 21. When knob 96 has been moved to the non-second drive state position of FIGS. 20 and 21, the interconnection of knob 96 and linkage 100 results in engagement gear 74 translating to a position so that gear 74 does not engage sprocket gear 65 of transmission 30 and motor gear 72. According to another embodiment, engagement gear 74 may be moved into a position ensuring that engagement gear 74 does not engage at least one of sprocket gear 65 of transmission 30 or motor gear 72.

As linkage 100 moves engagement gear 74 out of engagement with transmission 30 and motor gear 72, linkage 100 will also move control portion 114 relative to body portion 110 of catch 78 to withdraw at least a portion of extension member 112 into body portion 110. Extension member 112 is withdrawn sufficiently into body portion 110 so that no portion of extension member 112 remains located within notch 54. Once no portion of extension member 112 resides within notch 54, drum 44 may rotate freely and allow transmission 30 to shift from the neutral position as desired.

With reference again to FIGS. 18 and 19, it should be noted that when second drive mechanism 32 is moved into the second drive state, engagement gear 74 connects motor gear 72 to sprocket gear 65 of transmission 30, which is in the neutral state. Thus, when second drive mechanism 32 is in the second drive state, rotation of motor shaft 82 by motor 70 will be translated to transmission 30 by way of motor gear 72 and engagement gear 74. Furthermore, since second drive mechanism 32 may only be moved into the second drive state when transmission 30 is in neutral, the rotation of motor shaft 82 will be communicated to sprocket gear 65 of transmission 30 and subsequently into rear wheel 14 by a belt, chain, or other manner.

With reference to FIGS. 22-25, an alternative second drive mechanism arrangement 132 including a knob assembly 176 is shown. Knob assembly 176 includes a knob 196, a stop 184, a bracket 188, a shaft 198, joints 202, and a linkage 200. Knob 196 is connected to stop 184 so that knob 196 controls movement of stop 184. Stop 184 is positioned within slot 190 of bracket 188 such that the movement of stop 184 is restricted within slot 190. Similarly movement of knob 196 is limited to that of stop 184 positioned within slot 190. Shaft 198 is operably connected to knob 196 through joint 202. Joint 202 allows shaft 198 to rotate and pivot with respect to knob 196. Joint 202 may comprise a flexible sheave, a ball and socket joint, a universal joint, or other similar joints allowing for shaft 198 to twist and pivot with respect to knob 196. Linkage 200 connects to both engagement gear 74 and shaft 198. Linkage 200 may be connected to engagement gear 74 in any suitable manner that provides that linkage 200 does not interfere with necessary rotation of engagement gear 74 about shaft 90. Preferably any such linkage 200 creates translational movement of engagement gear 74 along shaft 90 when desired. Linkage 200 may include a crescent-shaped member 206 positioned to engage gear 74. Translation of knob 196 controls movement of engagement gear 74 as described in greater detail below.

Knob 196 also controls movement of safety catch 78. As shown in FIG. 12 and described earlier, safety catch 78 controls the ability of shift drum 44 to rotate from the neutral position. A push-pull cable 108 operably connects knob 196 and control linkage 114. Push-pull cable 108 is connected to stop 184 at aperture 186. Rotation of knob 196 rotates stop 184 and transfers movement to safety catch 78 through push-pull cable 108. Other mechanisms capable of communicating movement from knob 196 to control linkage 114 may also be used. In general, cable 108 converts movement of knob 196 into movement of control linkage 114 and extension member 112 relative to body portion 110. Rotation of knob 196 controls movement of safety catch 78 as described in greater detail below.

Figure 22:
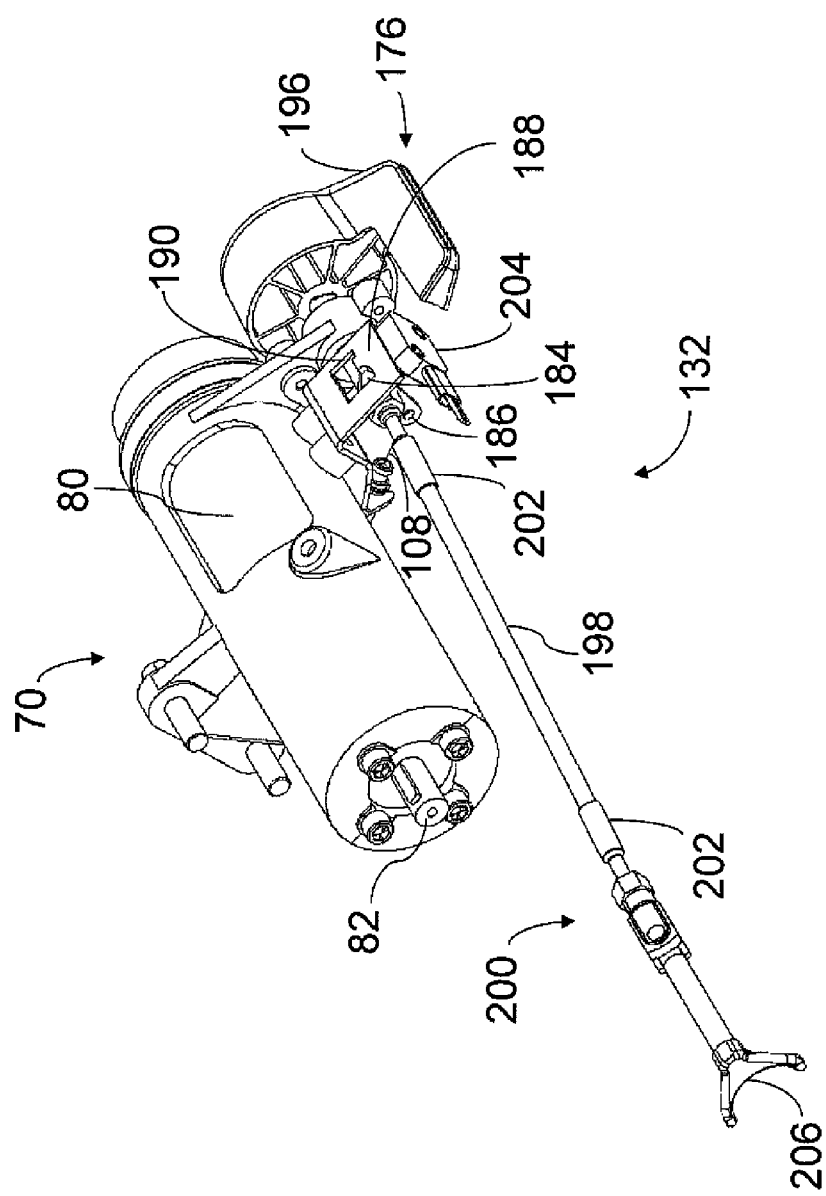
FIG. 22 is a perspective view of an alternative drive mechanism arrangement including a knob assembly showing the arrangement in a first position that interacts with the transmission.

FIG. 22 shows second drive mechanism arrangement 132 in the non-second drive state. In this position, the interconnection of knob 196 and linkage 200 results in engagement gear 74 translating to a position so that engagement gear 74 does not engage sprocket gear 65 of transmission 30 and motor gear 72. According to another embodiment, engagement gear 74 may be moved into a position ensuring that engagement gear 74 does not engage at least one of sprocket gear 65 of transmission 30 and motor gear 72. The interconnection of knob 196 and catch 78 results in extension member 112 translating to a retracted position so that it does not engage drum 44 when the transmission 30 is in the neutral state. In this position transmission 30 is not locked in the neutral state and may shift into any desired gear.

Figure 23:
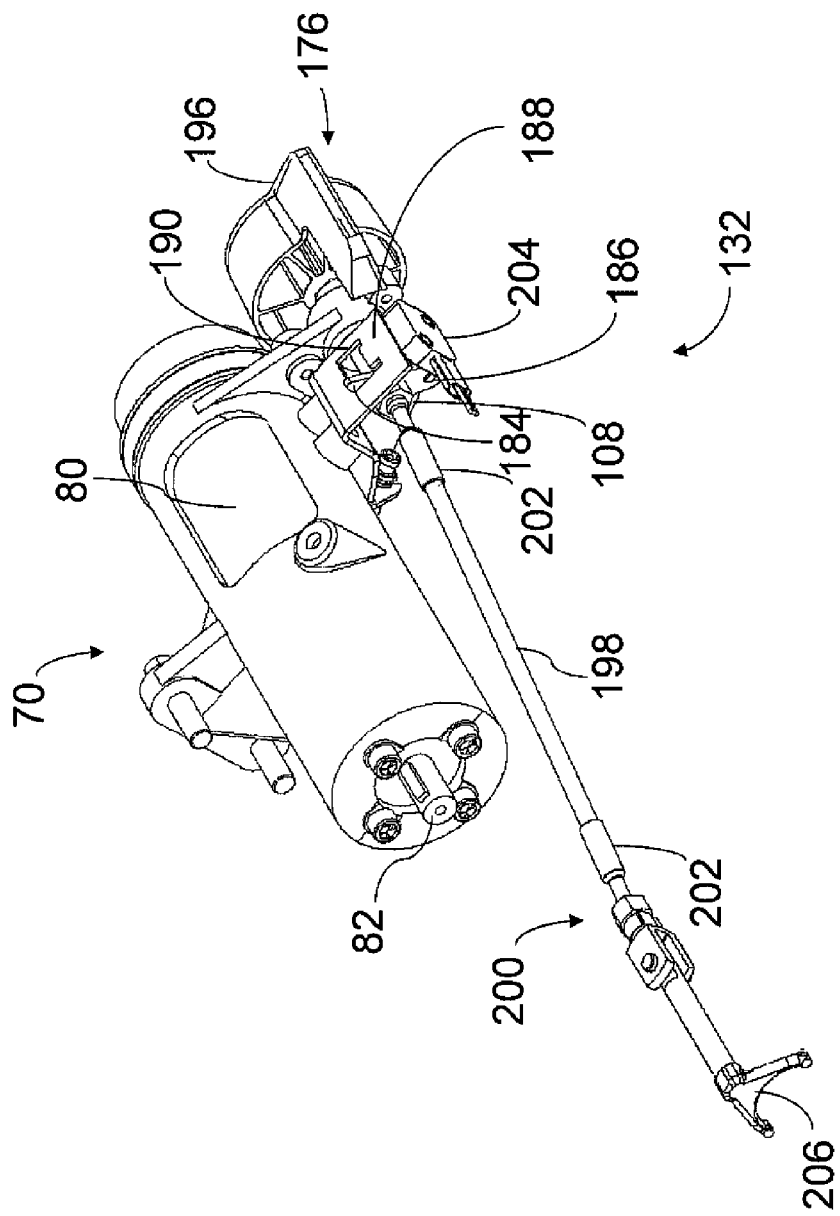
FIG. 23 is a view similar to FIG. 22 showing the alternative drive mechanism arrangement in a second position.

FIG. 23 shows the first step of second drive mechanism arrangement 132 being moved into the second drive state. In comparing the position of knob 196 in FIG. 23 to the position of knob 196 in FIG. 22, knob 196 has been rotated out of the non-second drive state. When knob 196 has been rotated as shown in FIG. 23, the interconnection of knob 196 and catch 78 results in extension member 112 translating to an extended position so that it engages with notch 54 of drum 44 when the transmission 30 is in the neutral state. Rotation of knob 196 rotates stop 184 and transfers movement to extension member 112 of safety catch 78 through push-pull cable 108 interconnected to aperture 186 on stop 184 and control linkage 114. In this position transmission 30 is locked in the neutral state and may not shift out of neutral gear. Catch 78 prohibits rotation of knob 196 if transmission 30 is not in the neutral state as extension member 112 is not able to translate into notch 54. In this position, the interconnection of knob 196 and linkage 200 results in no translation of engagement gear 74 such that it remains disengaged with sprocket gear 65 of transmission 30 and motor gear 72.

Figure 24:
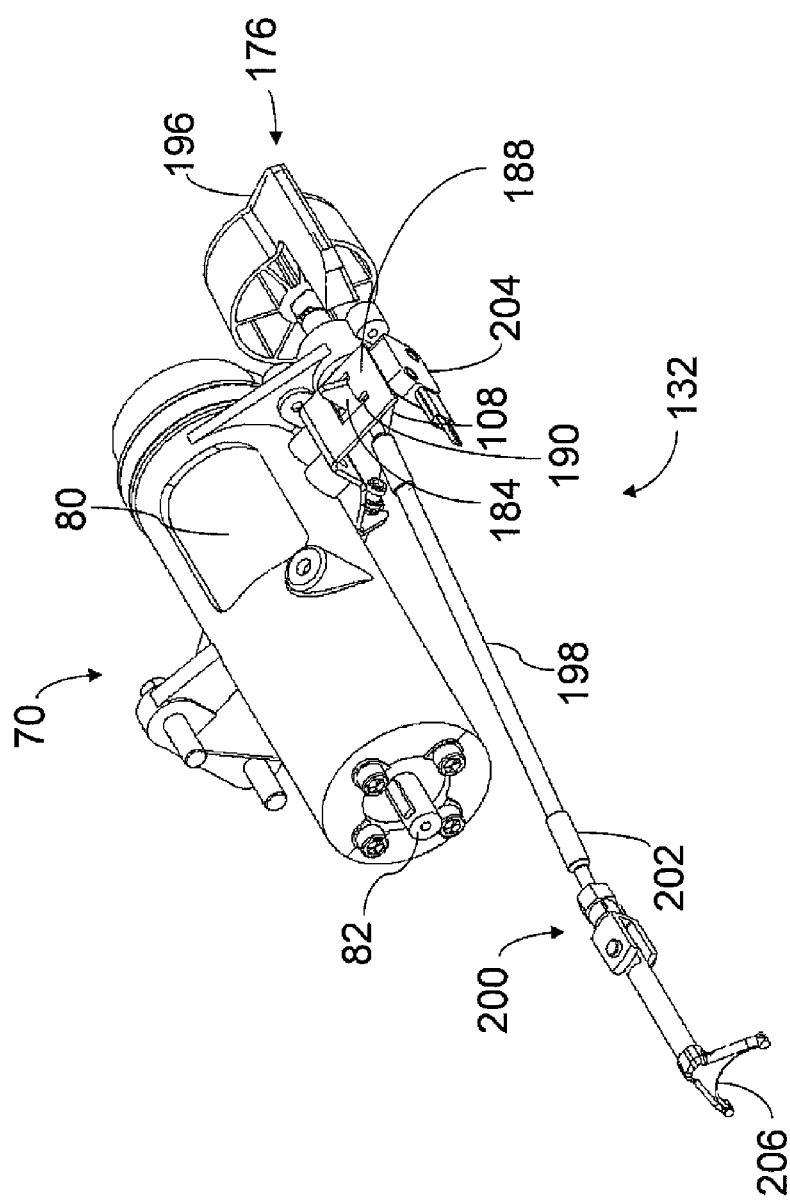
FIG. 24 is a view similar to FIG. 22 showing the alternative drive mechanism arrangement in a third position.

FIG. 24 shows the second step of second drive mechanism arrangement 132 being moved into second drive state. In comparing the position of knob 196 in FIG. 24 to the position of knob 196 in FIG. 23, knob 196 has been moved such that the interconnection of knob 196 and linkage 200 results in engagement gear 74 translating to a position so that engagement gear 74 engages sprocket gear 65 of transmission 30 and motor gear 72. Translation of knob 196 transfers axial movement through shaft 198, linkage 200, and crescent-shaped member 206 positioned to engage gear 74. Movement of knob 196 is limited to the movement of stop 184 positioned within slot 190 and may not translate further once stop 184 abuts slot 190. The interconnection of knob 196 and catch 78 results in extension member 112 remaining in the extended position so that it continues to engage drum 44 when transmission 30 is in the neutral state. In this position transmission 30 is locked in the neutral state and may not shift into gear.

Figure 25:
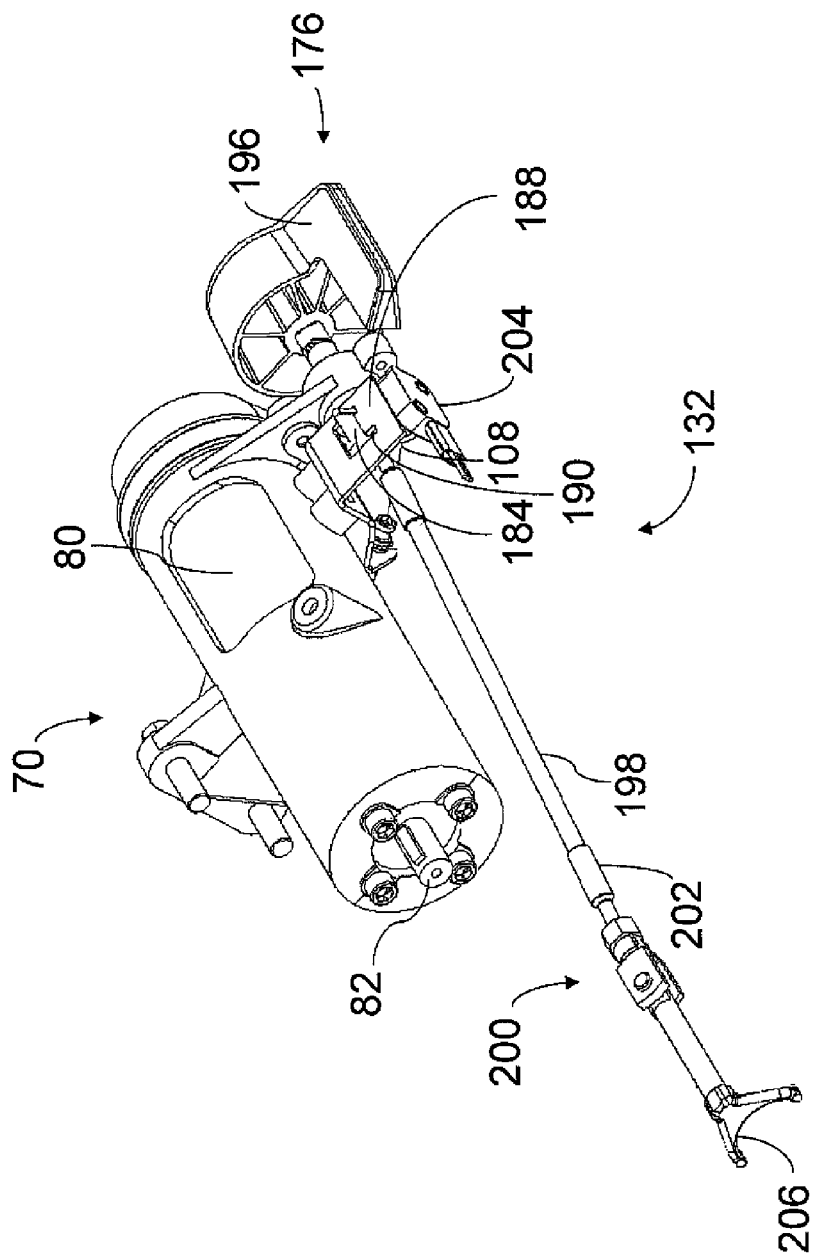
FIG. 25 is a view similar to FIG. 22 showing the alternative drive mechanism arrangement in a fourth position.

FIG. 25 shows the final position of the second drive mechanism arrangement 132 in the second drive state. In this position, stop 184 is rotated into a locked position maintaining the engaged position of engagement gear 74 and catch 78. The stop 184 is locked into position within slot 190 so engagement gear 74 is held in engagement with sprocket gear 65 of transmission 30 and motor gear 72 until knob 196 is rotated back to the unlocked position. In some embodiments, when knob 196 is released from the unlocked position shown in FIG. 25, knob 196 is automatically biased back to the non-second drive state shown in FIG. 22. Knob 196 may be biased to the non-second drive state by one or more springs operatively connected to the catch 78, engagement gear 74 and/or knob assembly 176.

The operation of motorcycle 10 is controlled by the rider. The operations include starting motorcycle 10, forward and reverse movement of motorcycle 10, and other features of motorcycle 10. With reference again to FIG. 1, steering assembly 20 of motorcycle 10 includes a start button 201 and a second drive state override sensor 204 (shown in FIGS. 22-25). Second drive state override sensor 204 automatically detects when the knob 196 has been moved to the second drive state position. In the preferred embodiment, second drive state override sensor 204 is comprised of a hall-effect sensor that detects a magnet (not shown) positioned on knob 196. When knob 196 is in a non-second drive state, hall-effect sensor is unable to detect the magnetic field of the magnet and remains unactivated. When knob 196 has been moved to the second drive state, hall-effect sensor is able to detect the magnetic field of the magnet and activates the second drive state override sensor 204. Second drive state override sensor 204 may alternatively be any type of sensor suitable for detecting when knob 196 has been moved to the second drive state position. For example, second drive state override sensor 204 may be a contact, plunger or linear pot sensor. Second drive state override sensor 204 may also be alternatively connected to catch 78, engagement gear 74 and/or anywhere along knob assembly 176 such that it detects when knob 196 as been moved from the non-second drive state position. For example, in one embodiment, a controller (discussed in greater detail below) may determine if extension member 112 of safety catch 78 extends into notch 54 of drum 44. If the controller determines that extension member 112 is fully extended, it may assume that transmission 30 is in neutral and second drive state is now able to operate. In other embodiments, second drive state override sensor 204 may be replaced by a manual override switch (not shown). Manual override switch may be any suitable switch capable of selecting between a first position and a second position, such as a toggle switch capable of toggling between the start position and the second drive state position, for example. As described below, inputs to start button 201 and second drive state override sensor 204 control when motorcycle 10 starts and when motorcycle 10 moves in the second drive state. Before attempting to move motorcycle 10 in the second drive state, the rider should place transmission 30 in neutral and rotate knob 196 to the position shown in FIG. 25 as discussed above.

Motorcycle 10 includes a controller (not shown), such as a mechanical or electrical controller, that receives inputs from start button 201, second drive state override sensor 204, and other inputs to start or operate motorcycle 10 in the second drive state. The controller may be any suitable type known in the art capable of determining the position of second drive state override sensor 204 and start button 201 and providing electrical or mechanical signals accordingly.

Figure 26:
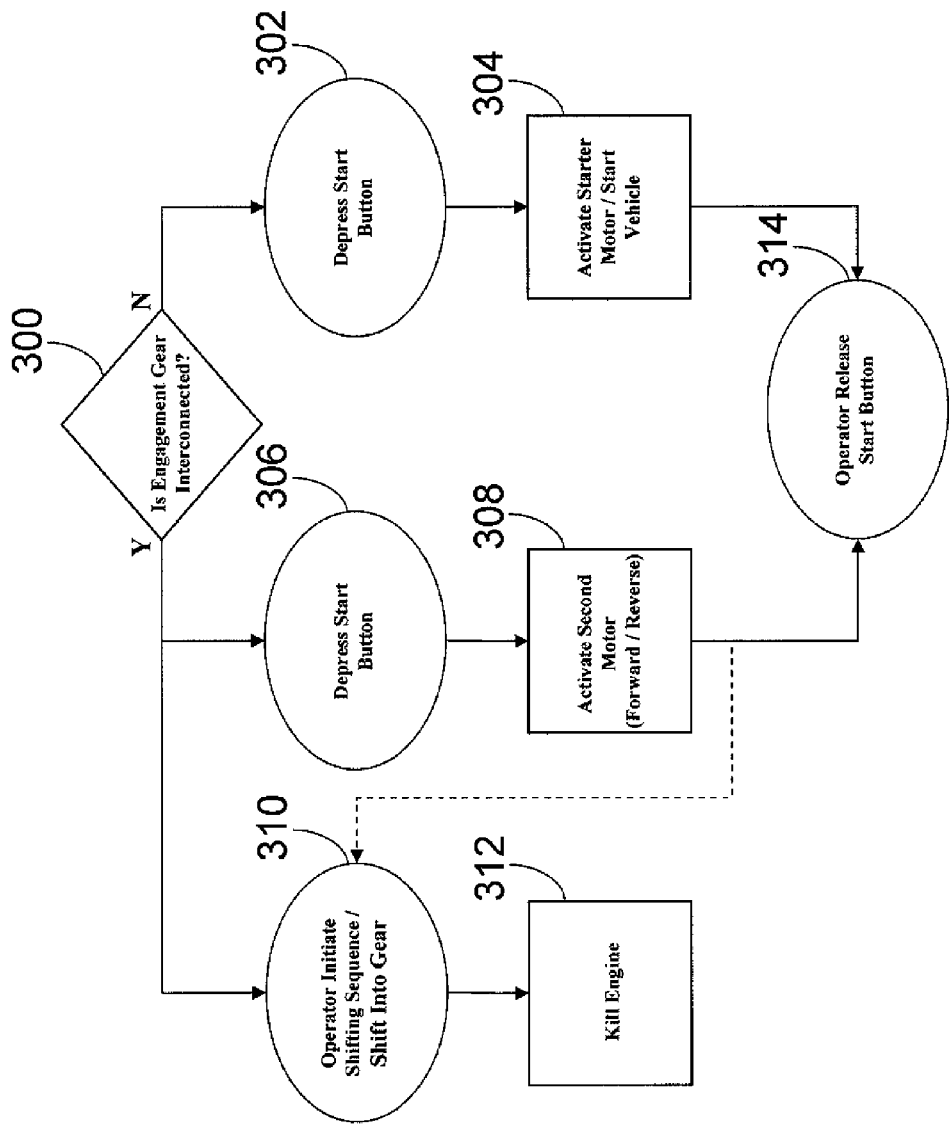
FIG. 26 is a block diagram showing the steps of activating the second drive mechanism of the present disclosure.

FIG. 26 depicts a flow chart illustrating preferred steps necessary to start motorcycle 10 and to activate respective second drive mechanism 32, 132 using start button 201 and second drive state override sensor 204. To start motorcycle 10, a rider moves engagement gear 74 out of engagement with sprocket gear 65 of transmission 30 and motor gear 72 and then presses start button 201. When second drive state override sensor 204 is not activated and start button 201 is depressed, the controller enables starter motor 211 to start motorcycle 10. When second drive state override sensor 204 is not activated as detected in block 300 and start button 201 is pressed as shown in block 302, starter motor 211 starts engine (first motor) 18 as shown in block 304.

To move motorcycle 10 in the second drive state, the rider must shift transmission into neutral and move engagement gear 74 into engagement with sprocket gear 65 of transmission 30 and motor gear 72. When engagement gear 74 is moved into engagement with sprocket gear 65 of transmission 30 and motor gear 72, second drive state override sensor 204 is activated as detected in block 300. When second drive state override sensor 204 is activated, the controller disables the vehicles' starter motor 211 and enables vehicles second motor 70. When second drive state override sensor 204 is activated and start button 201 is depressed as shown in block 306, the controller activates second motor 70 as shown in block 308 to place the motorcycle 10 in second drive state. Second motor 70 preferably continues to be activated until the operator releases the start button 201 as shown in block 314. If second drive state override sensor 204 is activated indicating that engagement gear 74 has been moved into engagement with sprocket gear 65 of transmission 30 and motor gear 72 as shown in block 300 and the operator is able to shift transmission 30 of the motorcycle 10 out of neutral position as shown in block 310, the controller shuts down the vehicles' engine (first motor) 18 as shown in block 312 if in prior operation engine 18 has been started as shown in block 304. The vehicles' engine 18 is shutdown if this occurs as a failsafe operation to prevent damage from occurring to engine 18, transmission 30 and respective second drive mechanism 32, 132. If the second drive state override sensor 204 is activated transmission 30 should not be able to be shifted out of neutral as catch 78 should be engaged with notch 54 of drum 44 locking transmission 30 in neutral. Additionally if the operator is activating second motor 70 as shown in block 308 and the operator is able to shift transmission 30 of motorcycle 10 out of neutral position as shown in block 310, the controller again shuts down engine (first motor) 18 as shown in block 312 if in prior operation engine 18 has been started as shown in block 304.

In some embodiments, the controller may be able to determine if engine 18 of motorcycle 10 is currently running and prevent the activation of second motor 70 if engine 18 is not running. Accordingly, if engine 18 is not operating, the controller resets or deactivates start button 201 so that second motor 70 may not be activated when start button 201 is depressed as in block 306. If necessary, engine 18 may be started by moving engagement gear 74 out of the second drive state position and pressing start button 201 as shown in block 302 activating starter motor 211 and starting engine 18. Then to enable second drive motor 70, engagement gear 74 may be moved back into second drive state position and depressing start button 201 will activate second motor 70. As mentioned above, second motor 70 will only activate when engine 18 is operating to prevent the battery from being drained of power.

As described above, in the preferred embodiment second drive motor 70 may operate in both forward and reverse direction as shown in block 308 of FIG. 26. As the operator actuates knob assembly to the second drive position, the knob assembly may move into either a forward position or reverse position. Alternatively, forward and reverse positions may not be integrated into the knob assembly and may be replaced by a separate switch manually activated by the operator. The separate switch may comprise any suitable switch capable of selecting between a first position and a second position, such as a toggle switch capable of toggling between a forward position and a reverse position, for example. In the preferred embodiments, when the second drive mechanism is activated the controller limits the speed of the vehicle to less than about five miles per hour. In other embodiments, when the second drive mechanism is activated the controller limits the speed of the vehicle to less than about ten miles per hour. In some arrangements, the controller limits the speed in reverse direction to a different value compared to the limit it sets the speed to in forward direction. For example the controller may limit the speed in the reverse direction to five miles per hour and limit the speed in the forward direction to ten miles per hour. Riders may use either the forward or reverse features when performing parking maneuvers or trailering. When trailering, motorcycle 10 is provided with a hitch (not shown) and trailer (not shown).

In an alternative embodiment, second drive motor 70 may be only able to operate in a single direction. As the operator actuates knob assembly to the second drive position, the second drive position comprises either a forward drive or a reverse drive. Therefore in this embodiment, second motor 70 may only operate in the reverse direction or forward direction, but not switch between a reverse direction and a forward direction. The speed of the second drive mechanism may be limited by the controller in this embodiment to a predetermined speed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle including:
   a chassis;
   a traction device adapted to contact the ground and propel the chassis;
   a first motor supported by the chassis;
   a transmission including a transmission housing and a member positioned in the housing, the transmission being adapted to selectively transfer power from the first motor to the traction device, the transmission having at least one engaged state in which drive power is transferred from the first motor to the traction device to propel the chassis in a substantially forward direction and the transmission having at least one disengaged state preventing drive power from being transferred from the first motor to the traction device; the member being configured to selectively block the transmission from moving from the disengaged state; and
   a second motor supported by the chassis that powers the traction device to propel the chassis in the substantially rearward direction at a first selected time and powers the traction device to propel the chassis in the substantially forward direction at a second selected time when the member retains the transmission in the disengaged state.

2. The vehicle as set forth in claim 1 wherein the transmission includes a plurality of gears, at least one shift fork and a shift drum including at least one race configured to engage the at least one shift fork and a notch configured to receive the member.

3. The vehicle as set forth in claim 2 wherein the transmission further includes a body portion and the member selectively extends from the body portion into the notch.

4. The vehicle as set forth in claim 3 wherein the notch is misaligned with the member when the transmission is in the at least one engaged state.

5. The vehicle as set forth in claim 1 further including a gear and a control knob connected to the gear, the gear selectively connects the second motor to the transmission.

6. The vehicle as set forth in claim 5 wherein the control knob is connected to the member to control whether the member selectively retains the transmission in the disengaged state.

7. The vehicle as set forth in claim 6 wherein the selective connection of the gear is controlled by rotating the control knob.

8. The vehicle as set forth in claim 5 wherein the gear selectively translates along a shaft between a first position wherein the gear does not engage the second motor with the transmission and a second position wherein the gear engages the second motor with the transmission.

9. The vehicle as set forth in claim 8 wherein the second motor includes a motor gear and the first mentioned gear engages the motor gear in the second position.

10. The vehicle as set forth in claim 1 wherein the second motor is an electric motor.

11. The vehicle as set forth in claim 1 wherein the second motor may be selectively engaged with the transmission.

12. The vehicle as set forth in claim 1 wherein the first motor is an internal combustion engine and the second motor is an electric motor.

13. The vehicle as set forth in claim 1 wherein the second motor is an electric motor and further comprising a controller receiving an input to select between the electric motor providing a substantially rearward motion and a substantially forward motion.

14. A vehicle including:
   a chassis;
   a traction device adapted to contact the ground and propel the chassis;
   an internal combustion engine supported by the chassis;
   a transmission adapted to selectively transfer power from the internal combustion engine to the traction device to provide substantially forward motion;
   an electric motor supported by the chassis that provides power to the traction device to provide at least one of substantially rearward motion and substantially forward motion;
   a controller configured to limit operation of the electric motor to when the internal combustion engine is operating,
   a gear configured to selectively engage the electric motor with the transmission,
   a catch configured to selectively retain the transmission in a neutral state, and
   a knob assembly connected to the gear and the catch, the knob assembly being configured to control the gear and the catch.

15. The vehicle as set forth in claim 14 further including means for connecting the knob assembly to the gear and the catch.

16. The vehicle as set forth in claim 15 wherein the catch includes a body portion and an extension configured to selectively extend varying distances from the body portion.

17. A vehicle including:
   a chassis;
   a straddle seat supported by the chassis;

a traction device adapted to contact the ground and propel the chassis, the traction device having an axis of rotation oriented in a substantially fixed position relative to the chassis;
a first motor supported by the chassis;
a transmission configured to transfer power from the first motor to the traction device to create rotation of the traction device about the axis of rotation in a first direction, the transmission including a housing and an external shaft extending from the housing in a direction substantially parallel to the axis of the traction device;
a second motor supported by the chassis and providing power to rotate the traction device about the axis of rotation in the first direction and a second direction, the second direction being opposite of the first direction.

18. The vehicle as set forth in claim 17 further including a catch configured to retain the transmission in a neutral state.

19. The vehicle as set forth in claim 18 wherein the catch includes a body portion and an extension configured to move between at least two positions with respect to the body portion, and the transmission includes a receiving area configured to receive the extension when the extension is located in at least a first position with respect to the body portion.

20. The vehicle as set forth in claim 19 wherein the extension does not extend into the receiving area whenever the extension is located in at least a second position with respect to the body portion.

21. The vehicle as set forth in claim 20 wherein the receiving area is a notch.

22. The vehicle as set forth in claim 19 further including an engagement gear configured to selectively engage the second motor with the transmission.

23. The vehicle as set forth in claim 22 further including a knob assembly connected to the engagement gear and the catch, the knob assembly being configured to control the positioning of the engagement gear and the extension.

24. The vehicle as set forth in claim 22 further including a motor gear connected to the second motor.

25. The vehicle as set forth in claim 24 wherein the engagement gear is moveable between at least two positions, the engagement gear transmitting rotation of the motor gear to the transmission at a first position and not transmitting rotation of the motor gear to the transmission at a second position.

26. The vehicle as set forth in claim 17 where the second motor is an electric motor.

27. The vehicle as set forth in claim 26 wherein the electric motor may only be activated if the first motor is activated.

28. A vehicle including:
a chassis;
a traction device adapted to contact the ground and propel the chassis;
a first motor supported by the chassis;
a transmission including a transmission housing, a shifting member, and a control member, the transmission being adapted to selectively transfer power from the first motor to the traction device, the shifting member being configured to receive an operator input indicative of a desired state of the transmission, the shifting member having at least one engaged state in which the operator input corresponds to a level of drive power transferred from the first motor to the traction device to propel the chassis in a substantially forward direction, and the shifting member having at least one disengaged state preventing drive power from being transferred from the first motor to the traction device; and
a second motor supported by the chassis that powers the traction device to propel the chassis in at least one of a substantially rearward direction and the substantially forward direction, wherein the control member is configured to prevent operation of the first motor when the shifting member is moved from the disengaged state as the chassis is propelled in the substantially rearward direction.

29. The vehicle of claim 28 wherein the control member is configured to block the shifting member from moving from the disengaged state independent of the operator input to the shifting member.

\* \* \* \* \*